US007881658B2

(12) United States Patent
Weisman et al.

(10) Patent No.: US 7,881,658 B2
(45) Date of Patent: Feb. 1, 2011

(54) METHOD AND APPARATUS FOR ENTERTAINMENT AND INFORMATION SERVICES DELIVERED VIA MOBILE TELECOMMUNICATION DEVICES

(75) Inventors: Jordan K. Weisman, Redmond, WA (US); William G. Redmann, Glendale, CA (US)

(73) Assignee: ZNL Enterprises, LLC

( * ) Notice: Subject to any disclaimer, the term of this patent is extended or adjusted under 35 U.S.C. 154(b) by 2104 days.

(21) Appl. No.: 10/683,561

(22) Filed: Oct. 9, 2003

(65) Prior Publication Data

US 2004/0148638 A1 Jul. 29, 2004

Related U.S. Application Data

(60) Provisional application No. 60/417,734, filed on Oct. 10, 2002.

(51) Int. Cl.
*H04H 40/00* (2008.01)
(52) U.S. Cl. .................. 455/3.06; 455/3.02; 455/456.1; 455/556.1; 725/138; 725/139; 725/44; 725/52; 725/53
(58) Field of Classification Search ............. 455/414.1, 455/422.1, 426.1, 448, 454, 455, 456.1, 457, 455/3.02, 456.6, 517, 556.1, 561, 566, 432.3, 455/3.03; 725/34, 35, 135–139, 4, 40, 42, 725/44, 46, 52, 53
See application file for complete search history.

(56) References Cited

U.S. PATENT DOCUMENTS 5,852,610 A * 12/1998 Olaniyan ..................... 370/486

6,064,380 A * 5/2000 Swenson et al. ............ 715/273

(Continued)

FOREIGN PATENT DOCUMENTS

EP          0 820 180 A2    1/1998

(Continued)

OTHER PUBLICATIONS

Intuity Conversant System Version 7.0 System Description 585-313-204 Issue 1.0 Apr. 1998, p. 77, last two paragraphs.

(Continued)

*Primary Examiner*—Sujatha Sharma
(74) *Attorney, Agent, or Firm*—Davis Wright Tremaine LLP; George C. Rondeau, Jr.

(57) ABSTRACT

A method and system for entertainment and information services delivered via mobile telecommunication devices include a communication network, and a station communicatively linked to the communication network. The station includes an output and an interface. Also included is a head-end having at least one database configured to store programs including an audio content. The head-end receives a request from the station for a desired one of the programs, verifies the request, transmits a first portion of the desired program to the station, and records an association between the identification and the desired program. The head-end further suspends transmission of a second portion of the program based upon detection of an indication to suspend transmission. The head-end further transmits the second portion of the program based upon detection of an indication to resume transmission and stored bookmark data indicating the starting location in the program of the second portion.

25 Claims, 5 Drawing Sheets

U.S. PATENT DOCUMENTS

| | | | |
|---|---|---|---|
| 6,182,113 B1* | 1/2001 | Narayanaswami | 709/203 |
| 6,433,795 B1* | 8/2002 | MacNaughton et al. | 715/738 |
| 6,560,640 B2* | 5/2003 | Smethers | 709/219 |
| 7,159,192 B2* | 1/2007 | Dobronsky | 715/835 |
| 2002/0010789 A1* | 1/2002 | Lord | 709/231 |
| 2002/0102954 A1* | 8/2002 | Kaneko | 455/142 |
| 2002/0174431 A1* | 11/2002 | Bowman et al. | 725/47 |
| 2003/0005433 A1* | 1/2003 | Janik et al. | 725/18 |
| 2003/0041334 A1* | 2/2003 | Lu | 725/113 |
| 2003/0061110 A1* | 3/2003 | Bodin | 705/26 |
| 2004/0198279 A1* | 10/2004 | Anttila et al. | 455/179.1 |
| 2005/0020223 A1* | 1/2005 | Ellis et al. | 455/186.1 |
| 2005/0020238 A1* | 1/2005 | Eastman et al. | 455/403 |
| 2008/0155616 A1* | 6/2008 | Logan et al. | 725/93 |

FOREIGN PATENT DOCUMENTS

| | | | |
|---|---|---|---|
| JP | 2005260645 | * | 9/2005 |
| WO | WO 99/62008 | | 12/1999 |
| WO | WO0217117 | * | 2/2002 |

OTHER PUBLICATIONS (Intuity Conversant System Version 6.0 Application Design Guidelines, Issue 1.0, Dec. 1996, chapter 4, p. 11).

* cited by examiner

METHOD AND APPARATUS FOR ENTERTAINMENT AND INFORMATION SERVICES DELIVERED VIA MOBILE TELECOMMUNICATION DEVICES

CROSS REFERENCE TO RELATED APPLICATION(S)

This application claims the benefit of Provisional U.S. Patent Application No. 60/417,734, filed Oct. 10, 2002.

BACKGROUND OF THE INVENTION

Audiences of television and radio have demonstrated a demand for greater diversity of programming and greater control over when that programming is available. For over half a century, radio and television stations have provided widespread, nearly non-stop broadcasts of entertainment and informational programming. With the advent of the consumer grade VCR, a tremendous number of shows have been taped by consumers for viewing at a later, more convenient time.

At the same time VCRs were becoming popular, a fledgling cable television industry increased the number of program channels available. From about half a dozen broadcast stations in most television markets, cable television provided anywhere from double to ten times as many choices, almost overnight. As a subscription service, cable television was able to provide recent movies far sooner than advertiser-supported broadcasts. Audiences became accustomed to watching nearly current movies on television.

Households began accumulating personal libraries of favorite shows. Vast libraries of programming were sold into the consumer market. A commercially oriented analog to public libraries abounded, in the form of video rental stores. Nearly any movie made could be found and viewed on one's VCR (and now, DVD player), and most contemporary television series' episodes could be borrowed from someone who had taped them.

Cable, and more recently, satellite television, have provided a large number of potential channels. Competitive pressures have resulted in higher quality general-interest programming, and have induced many companies to carve out their market niche by delivering special interest programs.

Even with all this diversity of available programming, the audience, seemingly insatiable when it comes to variety and convenience, remains unsatisfied.

Video On Demand

Field tests of video-on-demand (VOD) services have abounded, with the ultimate goal of providing every possible program, whenever desired. Video servers, located at cable and Internet head-end offices store the video library of offerings. Subscribers, frequently through a set-top box, navigate a directory of the offerings and direct the remote servers to play a selection.

Though not a VOD product, a related system is taught in U.S. Pat. No. 5,572,442, by Schulhof et al. in the form of a distribution system for audio program materials, nearly audio-on-demand. Schulhof provides a player having a removable storage module. The player would be, for instance, installed in a car. The storage module can be removed from the car, and taken to a docking station having a connection to a network. Through the docking station's connection, audio programming is downloaded from a remote source and stored on the memory module. When the module is restored to the player, the downloaded materials are available for playing.

In U.S. Pat. No. 5,930,493, Ottesen et al. have provided a multimedia server suitable for video-on-demand services. The multimedia data are stored in standard compression formats, and the server is able to support a number of concurrent, individually requested show segments.

A system for video-on-demand by Hiroaki Ueda, in U.S. Pat. No. 5,815,194, ensures before sending a video program that the receiving terminal has adequate storage. Billock et al., in U.S. Pat. No. 6,314,575, teach a full featured video-on-demand system that recognizes and differentiates between subscribers and non-subscribers to a service. Everyone is able to view preview clips of shows available on the servers. However, only subscribers have access to the actual shows themselves. Further, when a non-subscriber attempts to access a show, the system solicits the requester to subscribe to the system. This system is particularly adapted to data networks.

The field of video-on-demand systems is quite full, and there are numerous other examples which teach the implementation of multimedia servers.

Personal Video Recorders

A successful stop-gap to the challenges of providing each household with access to the almost limitless library of global television production past and present, has been the personal video recorder (PVR).

A PVR, such as those manufactured by TiVo, Inc. of Alviso, Calif., automates the capture of shows for later playback and has become the preferred method of viewing in many households. The PVR has access to a machine readable television guide, and can search for shows by topic, cast, crew, genre. Identifying viewers' favorites to the PVR, combined with the availability of hundreds of cable or satellite channels and the ability to capture programming around the clock, allows each household to accumulate a personalized, current, and instantly available viewing library, albeit limited to the amount of local storage provided. The content of this personal library is somewhat random, since it can only contain programming that has been aired recently, while not in conflict with another desirable program, and only when storage was available.

Nonetheless, audiences have made themselves clear with their consumer electronics purchases: The shows they want, when they want them.

Cellular Telephones

Another communication technology having achieved widespread availability over half a century ago, is the telephone, which, in the embodiment of the mobile wireless cellular telephone, has sold over half a billion handsets worldwide.

The infrastructure necessary to support cellular telephone handsets is significant and expensive. Even so, the cellular infrastructure initially deployed as an analog technology, has been replaced by a digital one to provide higher voice quality and more reliable operation. In addition, digital services have been added, such as wireless messaging and a degree of Internet access.

Most recently, cellular telephones have entered the next generation of development. Though the investment in these third generation (or 3G) mobile broadband capable systems is in the hundreds of billions of dollars, all is not rosy. Betrand Bidaud of Gartner, an information technology research organization, attributes the severity of the downturn in the telecommunication industry to three simultaneous problems: "One is the economic downturn in the US and the world. Second, is the fact that the forces driving the industry such as internet and cellular services are starting to reach a plateau in most developed markets, meaning that the growth is much slower . . . And third, what is missing is a new innovation that would generate new growth."

It was expected that non-voice services, such as image exchange and electronic games, newly enabled by high-speed digital communication, would drive adoption of the new iteration. However, that presumed latent demand is yet to materialize. The cellular telephone enhanced services infrastructure is still waiting for its "killer app," the application which will make 3G cellular phones a must-have product.

There exists an opportunity between the audience's insatiable desire for personalized and readily available information and entertainment, and industry's pending ability to provide ubiquitous cellular access to broadband digital services.

Dedicated Channels vs. Packet Networks

There is a difference in the way that telephones and networked computers operate. The telephone converts the voice of a caller into a stream of electrical impulses. These impulses, which are transmitted immediately to the other telephone conversation participant, or in the case of a conference call, participants. Early telephones used analog electrical techniques, but modern telephone systems digitize the signal, typically at the local exchange. A digitized telephone signal is reconverted to analog at the receiving exchange.

Until relatively recently, a telephone signal was assigned to a physical channel (e.g. specific cables, microwave links, etc.) at the time a call was placed. The assigned channel provided the connection between the stations of the telephone call. To make better use of channel components, multiple telephone signals are multiplexed to allow a cable or microwave link to carry many telephone signals simultaneously. Switching equipment at the originating and terminal exchanges, and often other intermediate locations, select and assign the channel for the call. The bandwidth is dedicated and remains in use throughout the duration of that call.

Packet switched networks, such as the Internet, use a different switching technique. Pieces of data are routed from point-to-point from the originating station to a remote terminal, much as is the signal of a telephone call. However, data are divided into small packets, each provided with information about the destination and independently routed. There is no requirement that the same cable, microwave link, or optical fiber carry every packet. As each packet arrives at each switch, the packet may be instantly routed to the next point, but since the data does not have any bandwidth specifically allocated to it, immediate routing is not assured. If traffic at that switch is too great, the packet may be momentarily stored, until there is sufficient bandwidth becomes available. Alternately, a packet may be routed to a different switch, if the system deems that an alternate route may be available.

Ultimately, on the Internet, some packets may not get delivered. The delivery processes require only a "best effort" level of service, not absolute reliability. If required, messages can be exchanged between the source and destination terminals to confirm receipt, or if necessary, request retransmission of missing packets. Protocols have been developed, such as TCP/IP, to provide just such a reliability mechanism.

Streaming Media

Historically, data was passed over networks as files. A performance, such as a song, would be stored in digitized form as a file on a computer. That file could be sent via a switched network to a second computer. Once it was received, in total, it could be played by software resident on the second computer. File transfer techniques are well understood. Protocol standards such as the File Transfer Protocol (FTP) permit files to be moved among computers even in the presence of an unreliable network. The files are broken up into a sequence of packets, and any packet that gets lost will be identified and resent until every packet has been received accurately and the file is reconstructed.

Such techniques, however, are limited to completed performances. An ongoing performance, for instance a radio show, or a telephone call, require a different approach: The second computer is going to start playing the performance before an end is received. This approach treats media as a continuous stream. It is perfectly reasonable to start playing at any point in the stream, and continue playing indefinitely.

Streaming media technologies have been widely taught. Glaser, et al., in U.S. Pat. No. 5,793,980 and its continuation U.S. Pat. No. 6,151,634, describe an audio-on-demand mechanism for the delivery of audio and accompanying multimedia data via a dial-up or other network connection. Such mechanisms are embodied in the streaming media servers and players by RealNetworks, of Seattle, Wash. Apple Computer, of Cuppertino, Calif. with its QuickTime products, also provides usable streaming media technologies, such as those taught by Batson et al., in U.S. Pat. No. 6,098,126, and Jones et al., in U.S. Pat. No. 6,134,243.

Interactive Voice Response

Pre-recorded telephone messages were initially used to announce an automatic answering machine. Information services, such as time-of-day, provided pre-recorded message elements that were composed by an automatic process.

With the introduction of touch-tone telephones (DTMF technology), systems followed that accepted in-band signaling (the touch-tones) allowing telephone customers to transmit commands or responses that could be understood by a remote machine.

Initially, Interactive Voice Response (IVR) systems make use of commands and responses that customers provide using touch-tone keys to provide a selection of pre-recorded information messages. IVR system enhancements include synthesized voice and voice recognition. Synthesized voice allows on-the-fly generated data, such as an account balance or computer generated weather report, to be announced; and voice recognition, whereby a caller can speak a command or response, can replace touch-tone commands.

Advanced Conference Calling System

Co-pending U.S. patent application Ser. No. 10/238401, filed on Sep. 10, 2002 by Weisman et al. and entitled Method and Apparatus for Improved Conference Call Management, is herein incorporated in its entirety by this reference. Weisman teaches a way of managing conference calls that allows individuals to spontaneously initiate or join existing conference calls based on subject and/or proximity, and yet collectively retain sufficient control so as to keep the social environment manageable.

FIELD OF THE INVENTION

The present invention relates generally to a way to provide entertainment and information services over a communication channel. More specifically, it provides a way to deliver selected program materials to a user having a communication device, such as a telephone or computer. More specifically still, it provides a way to deliver selected audio program materials to a modern mobile telephone.

DESCRIPTION OF THE RELATED ART

As the next generation of digital telephones are deployed, the non-voice services are the primary driver for an owner to replace a present, working cellular telephone.

In spite of the amazing array of technology platforms for communicating information over networks such as the telephone system and the Internet, and for providing information and entertainment, such as interactive voice response systems, video-on-demand services, and personal video recorders, there remains an unmet need for immediate, portable access to an open-ended library of entertainment and informational programming that is both extensive and personalized.

Additionally, access to entertainment and information needs to respond to continuing changes in availability and interest. By the nature of today's society, individuals are subjected to frequent interruptions—"My time is not my own," goes the common lament. For this reason, it is difficult to find an uninterrupted interval during which entertainment or information may be enjoyed or obtained.

Consider a morning commuter: Upon boarding the morning train, he might undertake to be informed of the day's top news. Suppose he is interrupted by a telephone call. Later in the trip, he is interrupted again by the activity of transferring to another train. Multiple times he needs to stop his news program for resumption later. A newspaper can sometimes do this well, a radio does not.

Suppose that our commuter is in-bound on the highway and is fighting traffic. As he approaches each major interchange, he might wish to get a quick traffic update to determine whether he should seek an alternate route. In a few radio markets, certain news stations provide traffic reports every ten minutes. Sometimes more frequently. But these periodic traffic reports are non-optimal for someone who needs to know the current traffic situation in the next minute in order to make an informed decision about an impending turn-off for an alternate route, and they are also quite annoying to a listener not concerned with a commute.

Adding to our hypothetical commuter's plight the spectre of constantly changing priorities, and it is quickly seen that what information one needs, or what entertainment one seeks, might change many times through the day: Suppose our commuter began his rail journey by enjoying a bit of entertainment instead of the news, perhaps an audio book. The interrupting telephone call informs him of a news item of concern. The audio book is abandoned, and he turns to find an appropriate news source. Not only is there a need for keeping one's place, but that should the case with multiple programs simultaneously.

It is commonly the case that one recognizes that a particular news segment or joke or even an advertisement would be of interest to a particular friend. Thus comes a need for a way to capture a portion of a stream, or at least a reference to it, so that it might be shared with someone else at a future time.

A related observation is that, in the good old days, when the number of broadcast networks were few, a given evening's televised offerings might include just two or three significantly popular shows. The likelihood that a friend, colleague, or playmate had seen a particular show, or at least heard about it, was relatively high. As such, the common experience of having been members of the tele-audience provided a basis for social interaction: "What did you think of the show? What would you have done in her situation? Would you have ever expected him to do that?" or in the case of sports events, "What is up with that team?"

In today's world of hundreds of simultaneous offerings, the chances that a particular colleague was a part of the audience for the same programming you were is greatly reduced. This has engendered a need for a way to find individuals having shared similar experiences, or anticipating the same shows that you anticipate. The way might operate in a manner analogous to a book club, where members select a novel which each reads and the group subsequently gathers to discuss. Instead of selecting only books for discussion, sporting events, radio dramas, news stories, could be the basis for an ad hoc group. In fact, a common-interest group might gather before, during, or after such a show.

There is also a need for a way to measure access to such services, to allow for billing. Alternatively, measured access would allow sponsorship of an audience by an advertiser. Another alternative, a way is needed to limit access to a subscribing audience. Any or all of these needs, if satisfied, would permit this invention be applied in a successful business endeavor.

BRIEF SUMMARY OF THE INVENTION

Embodiments of a method and system for entertainment and information services delivered via mobile telecommunication devices include a communication network, a station communicatively linked to the communication network, the station having an output and an interface. Also included is a head-end having at least one database configured to store programs including an audio content. The head-end is configured to receive a request from the station via the communication network for a desired one of the programs. The head-end is further configured to verify the request by determining an identification, transmitting a first portion of the desired program to the station via the communication network based upon the request verification, and recording an association between the identification and the desired program. The head-end is further configured to suspend transmission of a second portion of the program based upon detection of an indication to suspend transmission. The head-end is further configured to transmit the second portion of the program based upon detection of an indication to resume transmission and based upon stored bookmark data indicating starting location in the program of the second portion.

In some embodiments, the head-end is configured to generated and store the stored bookmark data upon detection of the indication to suspend transmission. In other embodiments the station is configured to generate and store the stored bookmark data. The head-end can be configured to determine the indication to suspend by the station ceasing communication on the communication network due to one of the following conditions: the station is a telephone and the user hangs up, the station is a cellular telephone and the cellular signals has been lost, the station is a computer and the computer has stopped transmitting an active keep alive network signal on to the communication network, the keep alive network signal being one of the following: a heartbeat and a periodic stream of acknowledgements. In some embodiments, the station is a cellular telephone and the communication network is a cellular communication network.

The interface of the station can include a save control, the station being configured to generate the bookmark data based upon activation of the save control. The interface of the station can include a bookmark control, the station being configured to generate the bookmark data based upon activation of the bookmark control. The interface of the station can include a save control, the head-end being configured to generate the bookmark data based upon activation of the save control.

The interface of the station can include a bookmark control, the head-end being configured to generate the bookmark data based upon activation of the bookmark control. The head-end can be configured to store the bookmark data. The station can be a non-cellular telephone. The station can be a computer.

The station can be a telephone and a computer. The communication network can be at least one of the following: a telephone network and a computer network. The station can be configured to store the bookmark data.

The system can include a plurality of stations other than the station, the plurality of stations including at least one of the following: a cellular telephone, a computer workstation, and a non-cellular telephone. The request verification by the head-end can be based upon at least one of the following: a subscription plan, a content rating of the desired program, and payment history associated with a user of the telephone. The station interface can include an in-progress user interface with a join button configured to, upon activation, join a first user activating the join button to a conference with other users of a program being received from the head-end. The station interface can include an in-progress user interface with a mark button configured to, upon activation, bookmark a segment of a program being received from the head-end for subsequent retrieval. The station interface can include an in-progress user interface with a send button configured to, upon activation, send either a program or a link of the program being received from the head-end to another user.

The station interface can include an in-progress user interface with a save button configured to, upon activation, save a program being received from the head-end for future play. The station interface can include an in-progress user interface with a pause button configured to, upon activation, halt playing of a program stored on the head-end. The station interface can include a select show dialog based upon voice recognition. The station interface can include a selection menu with at least one of the following: a select button configured to select a program stored on the head-end and a clear button configured to clear a program selection previously made. The station interface can include a selection menu with a selection prompt associated with selection of a conference call associated with the desired program.

The at least one database of the head-end can include a holdings database configured to store information regarding at least current users of the head-end, the information including data about programs stored in the at least one database being used by the users. The identification determined by the head-end can be based upon at least one of the following: a caller-identification code and an internet protocol address. The head-end can include cache servers located in different geographical areas. The head-end can further include an access manager and a media server, the access manager being configured to accept and process commands and queries from the station via a receive buffer and is configured to transmit status and programs back to the station via a transmit buffer, the access manager configured to control the media server to serve programs stored on the at least one database.

The station can be a cellular telephone configured to receive audio and data over separate communication channels and the communication network includes separate voice and data communication channels. The output can be a display and a speaker. The station can further include a buffer to store received portions of the desired program before being played by the output.

The station can be a computer and a telephone, the computer configured to receive at least text data from the head-end via the communication network, the head-end further configured to transmit at least text data to the computer and audio data to the telephone via the communication network. The communication network can include a telephone network and the Internet. The communication network can include at least one of the following: a telephone network, a local area network, a wide area network, and the Internet.

The interface of the station can be configured to provide a send selection capability that when activated by a user of the station sends a request to the head-end via the communication network to send information associated with the desired program to another user.

The interface of the station can be configured to bookmark a portion of the desired program such that when the bookmark is activated the head-end commences transmission of the desired program from the portion beginning.

The station interface can be configured to facilitate selection of the desired program from the programs in the at least one database of the head-end. The interface can be configured to be presented on the output. The interface can be configured to be presented on other than the output.

The at least one database of the head-end can store information including at least one of the following: representations of subject matter of the programs, availability of the programs, identification of users currently using each of the programs, preferences and listening status of each of the current users and the head-end is configured to transmit the information to station upon request of the head-end by the station. The association between the identification and the desired program recorded by the head-end can be further configured for billing of a user of the station that used the interface to generate the request for the program. The identification determined by the head-end can be configured to identify one of the following: the station and a user of the station.

These and other features and advantages of the invention will be more readily apparent upon reading the following description of a preferred exemplified embodiment of the invention and upon reference to the accompanying drawings.

BRIEF DESCRIPTION OF THE SEVERAL VIEWS OF THE DRAWING(S)

The aspects of the present invention will be apparent upon consideration of the following detailed description taken in conjunction with the accompanying drawings, in which like referenced characters refer to like parts throughout, and in which.

DETAILED DESCRIPTION OF THE INVENTION

Figure 1:
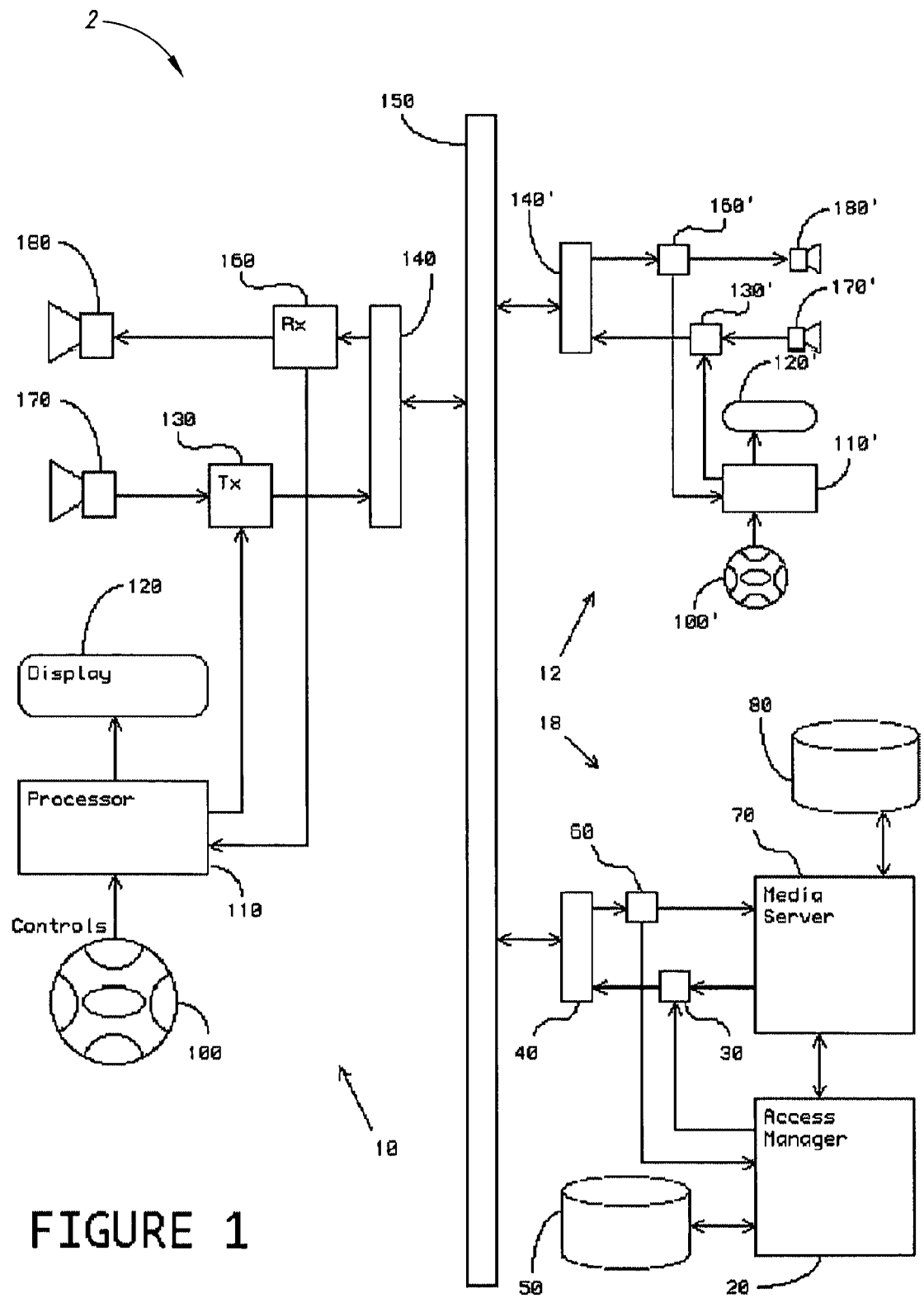
FIG. 1 is a detailed block diagram of an implementation of the communication system showing multiple participant stations configured to operate over a communication channel, and including a head-end having an access manager and media server.

A communication system and method is described herein to provide entertainment and information services over a communication channel. The entertainment and information services may be music, current radio broadcasts, news programs, audio books, old-time radio dramas, or audio choose-your-own-adventure games. The services are primarily audio, but may include visual enhancements such as still images or even video clips. The communication channel may be a telephone network, or a data network such as the Internet.

More specifically, the communication system provides a way to deliver selected program materials to a user having a communication device, such as a telephone or computer. More specifically still, in some implementations the communication system provides a way to deliver selected program materials, primarily comprised of audio, to a mobile telephone.

Each participant has a station, consisting of at least a telephone and controls to provide the participant with input, and preferably a processor and a display written by the processor. The telephone and processor are in communication with a head-end that provides the access to media services described below. This communication occurs over one or more channels such as a hardwired telephone line, a wireless connection, network, or Internet. A voice-over-data service may be employed.

Though a traditional telephone keypad can suffice, it is preferable that the controls include an additional input device for convenient entry of selections and preferences. The telephone keypad, a keyboard, a mouse, a joypad and buttons, a pen interface, or voice command system are some of the many viable input devices. Each has strengths and weaknesses.

The display is used by the processor to show current preferences and selections made by the participant, to indicate show available, and to indicate the status of the show in progress.

Using the controls, the participant can request and control the playback of a show of the participant's choosing.

The head-end provides a clearinghouse of show and participant data. Show data may include representations of the show's subject matter, availability, current participant list, and each participant's preferences and listening status.

The head-end is also responsible for providing, for each show, the media services required to deliver the show to the participant's station.

A buffering scheme is preferably employed to ensure that interruptions of the communication channel have a minimum impact on the performance of a participant's station and the delivery of shows.

The processor of a participant station, through the controls and display, preferably provides a user interface (UI). Initially, the UI is used to select shows or establish preferences. Alternatively, an interactive voice response system can be used to provide the UI.

Once a show is selected, the UI provides a means for a participant to control the playback of the show. For example, the UI can indicate the identity of the current show or its cast. The UI may provide data concerning the status of the playback, such as a display of the time remaining.

The UI preferably provides a way for the participant to bookmark a passage or event in the show for later recall or for transferring to another participant. Such a feature is a built-in mechanism to promote and facilitate word-of-mouth advertising, which is, of course, the best kind.

Implementations of the communication system assist to make shows having an episodic, serial, or chapterwise organization more easily navigable.

Another aspect of the communication system aids in promoting social interaction by assisting participants enjoying a show to find other participants having common tastes and to initiate an ad hoc conference call.

A further aspect of the communication system measures a participant's use of media services and to regulate that use according to a selected billing scheme.

A related aspect permits advertisers to subsidize some or all of a participant's use of media services in a manner that can be particularly targeted on any of demographic and location based parameters.

Another related aspect provides participants with management of their own privacy by maintaining for each participant an alias having at least one generally available public part and a selectably revealed private part. A further aspect provides more than one public part, which is selected manually or automatically according to context.

A related aspect of this invention provides a mechanism by which a participant's voice may be disguised, and to allow a participant to drop the disguise for selected other participants.

Another aspect makes it easy to invite others to become participants to a show.

Referring to FIG. 1, a communication system 2 includes a plurality of independent and separately operated participant stations represented by stations 10 and 12, which are connected by a communication channel 150 to a head-end 18.

Note that while the term "participant" is used throughout, what is meant is simply the user of the communication system 2, though most typically it may be that the user is a human, it is also possible that one or more participants could be a computer program (not shown), designed to peruse news services or test for compliance with advertising agreements.

In some implementations a single one of the head-end 18 is used whereas in other implementations multiple head-ends are used. Each of the stations 10, 12 communicates over a communication channel 150 directly with the head-end 18. The head-end 18 is responsible for responding to all pertinent selections made by the participant, which the stations 10, 12 are not able to handle.

The communication channel 150 may be a telephone network, a local or wide area Ethernet, the Internet, or any other communication medium, or combination thereof that can carry at least audio. In some implementations the communication channel 150 carries other data as well. For example, if the communication channel 150 is the Internet, data could be carried using UDP or TCP datagrams, and audio could be carried over a voice over IP (VoIP) protocol, or by other methods of streaming media. Other protocols familiar or developed by to those skilled in the art can be substituted. If the communication channel 150 is strictly an audio channel, then selections made using the stations 10, 12 can be communicated to head-end 18 using DTMF or other well-known in-band signaling techniques (some of which are discussed below).

Alternatively, separate audio and data channels comprise the communication channel 150. For example, voice can be carried over a switched telephone network, and data can be carried over a broadband network connection.

Many solutions to this data-plus-audio communication channel requirement are known, including, for example, modems compliant with the International Telecommunication Union V.70 specification, which can simultaneously carry both data and digitally encoded voice signals over a single dial-up phone line. Wireless solutions to the simultaneous voice and data problem are taught by Hillman et al., in U.S. Pat. No. 6,140,956, which provides for data to simultaneously and unobtrusively be sent over a wireless channel normally used for voice communication only. Software APIs, such as the DirectPlay and DirectVoice elements of DirectX 8.1 by Microsoft Corporation of Redmond, Wash. permit channels normally configured for data only to incorporate simultaneous digitized voice transmissions.

The plurality of the stations 10, 12 can be implemented as cellular telephones. For example, the station 10 as a cellular telephone would have a voice input 170 as a microphone, which is prepared and conditioned for transmission by a transmit buffer 130, and sent via a communication channel interface 140, to the communication channel 150, in this case the cellular network. Signals intended for the station 10 are received across the communication channel 150 and are detected and selected by the communication channel interface 140, and provided to a receive buffer 160 of the station 10. For those signals that represent audio, the receive buffer 160 routes the signal to an audio output 180 of the station 10, as a cellular telephone earpiece.

In this example of a cellular phone implementation, controls 100 of the station 10 may be a telephone keypad, but could alternatively be a joypad and select buttons, a touchscreen, or other efficient and ergonomic input device. A display 120 of the station 10 can be graphics enabled screen capable of resolution sufficient for an efficient and ergonomic user interface. A pure text or voice controlled interface, can also be used for the display 120. A processor 110 of the station 10 displays a user interface on display 120, and accepts input from the controls 100. The minimum duties of the processor 110 are to interpret the participant's inputs from the controls 100 as commands which are relayed via a transmit buffer 130 to the head-end 18; and to present on the display 120 the status information returned by the head-end 18 which is received by the processor 100 via the receive buffer 160.

In some embodiments, a buffer (not shown) of extent greater than that implied by the receive buffer 160 is operated under the control of the processor 110. As further described in association with FIG. 5.

Alternatively, the stations 10, 12 may be implemented as applications running on computer workstations, for example running a Windows XP operating system by Microsoft Corporation. In such an implementation, the workstations would be provided with the microphone input 170 and the audio output 180. The keyboard and preferably a mouse would comprise the controls 100, and the workstation monitor would comprise the display 120. An application running on the workstation would perform the function of the processor 110. The transmit buffer 130, and the receive buffer 160 can be implemented as a DirectPlay peer with an attached DirectVoice client. As such, interface hardware; whether a network interface card (NIC), broadband cable or DSL modem, or telephone modem, and the appropriate DirectX drivers would comprise the communication channel interface 140. The communication channel 150 can thus be a LAN, telephone service network, or the Internet.

In a variation of that alternative, the display 120 could be implemented as a browser window, such as provided by Microsoft's Internet Explorer or Netscape Communicator by Netscape Communication Corporation. The audio functions of the receive buffer 160 can be provided by any of a number of streaming media plug-ins, such as RealAudio from RealNetworks, Inc., or Quicktime, by Apple Computer, Inc. of Cuppertino, Calif. The user interface responsive to the controls 100 and further discussed in conjunction with FIGS. 2 & 3 can be implemented by HTML web pages and enhanced with JavaScript or Java applets.

In still another implementation, the stations 10, 12 can be an ordinary telephone used in conjunction and proximity to a computer workstation running an application to function as the processor 110. In such a hybrid implementation, the communication channel 150 is comprised of two parts: the telephone network to which the ordinary telephone is connected, and a data network to which the computer workstation is connected. In this hybrid implementation, the voice input 170 is implemented by a microphone of the telephone; the audio output 180 is implemented by a telephone earpiece. The telephone and computer workstation each have distinct transmit buffers 130, receive buffers 150, communication channel interfaces 140, and, likely, separate communication channels 150. Note that, for purposes of illustration, only a single transmit buffer 130, communication channel interface 140, communication channel 150, and receive buffer 160 are shown. In such an implementation, the computer workstation is preferably aware of the telephone number for the associated telephone. Alternatively, the telephone may be dialed into a prescribed number.

A variety of implementations will become apparent to those skilled in the art, especially when considering the simultaneous audio and data modems, and simultaneous audio and data communication on a cellular telephone discussed earlier. Further, it is apparent that a cellular telephone embodying separate voice and data communication channels would function in a manner analogous to the telephone and workstation implementation discussed above.

Further, in other implementations the stations 10, 12 can be heterogeneous, to include cellular phones, computer workstations, etc. The heterogeneous mix of different types of the stations 10,12 is managed by the head-end 18, which may increase in complexity in order to accommodate a larger variety of the communication channels 150 and potentially differing capabilities of the heterogeneous types of the participant stations.

The head-end 18 connects to the communication channel 150 via a communication channel interface 40. Signals or messages related to low level control of a media stream are received through the communication channel interface 40 by a receive buffer 60 of the head-end 18 and are sent to a media server 70 of the head-end. Signals or messages related to selection, initiation, or resumption of media services are sent to an access manager 20 of the head-end 18. The access manager 20 controls the media server 70, and the media server provides show or other data which is sent to a transmit buffer 30 of the head-end 18, all as described below. The access manager 20 accepts and processes commands and queries from the stations 10, 12 via the receive buffer 60, and sends back data indicating the status or results via the transmit buffer 30. Data and other signals received at the receive buffer 60 are identifiably related to one of the stations 10,12 from which it originated. Similarly, data and audio signals, sent by the access manager 20 and the media server 70, to the transmit buffer 30 are directed to designated of the stations 10, 12.

It will to be understood here, by those skilled in the art, that for certain instances of show transmission from the head-end 18 to the stations 10, 12 tuned to a common show, that it may be appropriate for multicast techniques to be used. Further, while not illustrated here, the media server 70, and perhaps more of head-end 18 may be implemented using regional cache servers or mirrors that are provided to better optimize bandwidth demands across links which may comprise the communication channel 150.

The communication channel interface 40, the transmit buffer 30, and the receive buffer 60 of the head-end 18 can have many implementations. For instance, in some implementations the communication channel 150 used by the head-end 18 includes a single channel whereas in other implementations the communication channel includes separate audio and data channels. Some implementations have a set of the transmit buffer 30, the communication channel interface 40, and the receive buffer 60 for each channel of the communication channel 150 and/or for each of a plurality of the communication channel for heterogeneous implementations of the stations 10, 12.

As previously mentioned, signals received at the receive buffer 60 for the control of the media server 70 are identifiable as to the originating one of the stations 10, 12. In a telephone network implementation, such identification may be the result of the specific telephone line providing the connection, whereas a data network implementation, an identifier such as the IP address of the station would be used. Similarly, a show's media provided by the media server 70 to the transmit buffer 30 are identifiably addressed to respective destination stations of the stations 10, 12. A corresponding identifiability applies for the data and signals moving to the transmit buffer 30 and from the receive buffer 60 from the access manager 20. As show in FIG. 3 the UI therein presented must be able to initiate a show on other presentation of data through the access manager 20 and subsequently control the media server 70.

In an alternative implementation, a single computer and database can be used to combine the functions of the access manager 20 and the media server 70 linked to a media database 80. However, it may be noted that the difference in the nature of the access management and media services tasks is often more efficiently handled by distinct devices and separate data sources.

In the course of selecting, initiating and resuming a show or other data presentation, the access manager 20 makes use of a participant/holdings database 50 (described in detail in conjunction with FIG. 4) to create, access, and update information about participants and shows.

Figure 2:
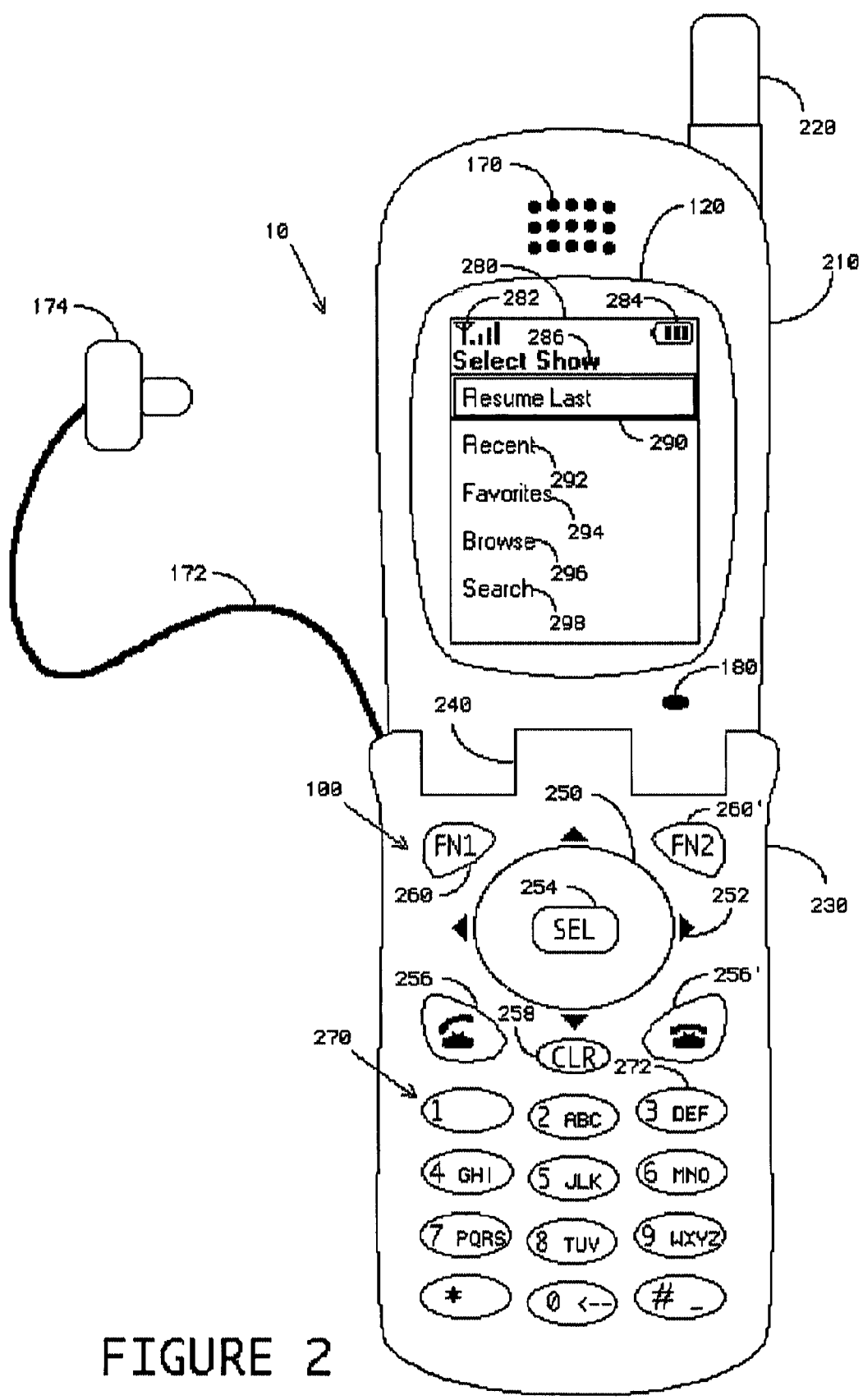
FIG. 2 shows a cellular phone implementing an implementation of a user interface for a participant's selection of a show.

Referring to FIG. 2, the cellular telephone implementation of the station 10 is shown in detail. As previously mentioned, equivalent functionality can be implemented on a personal computer with either internal audio functionality, or in conjunction with a separate telephone.

FIG. 2 is based upon a cellular telephone of the well-known "flip" type, though this type of cellular telephone is not a requirement. The cellular phone body is comprised of a display section 210 including the display 120, the audio output 180, the voice input 170, and from which protrudes an antenna 220. A touchpad section 230 includes the controls 100, and is mechanically connected to the display section 210 by a hinge 240.

The display 120 contains an implementation of a show selection menu 280 with a select show dialog 286 as part of an initial user interface (UI) for selecting a show.

A signal indicator 282 and a battery indicator 284 provide information pertinent to the cellular telephone, station 10: wireless signal strength and battery charge remaining, respectively.

In some implementations, a menu title 286 appears when the participant has indicated that accessing a show was desired. The menu title 286 marks the first level of a hierarchical show selection menu. The menu title 286 prompts the participant to select the type of conference call desired. In this exemplary implementation, items of the show selection menu 280 include a resume last pick 290; a selection of shows based upon a recently selected shows pick 292; a historically indicated as favorites pick 294; arranged in a list, a browse pick 296 preferably both hierarchical and categorical; and a search pick 298 accessible by structured or freeform search. The details of selecting a show are discussed below, in conjunction with FIG. 4.

In FIG. 2, the resume last pick 290 has been selected, as shown by the highlighting box surrounding it. At this point, the controls 100, when manipulated by the participant, interact with the display 120 through the processor 110 to form an intuitive user interface. As shown in FIG. 2, a joypad 250 is used to alter the selection. For instance, consecutive presses of the joypad 250 in the direction of the downward one of four directional indicia 252 results in sequentially downward selection of picks from the show selection menu 280. Consecutive presses of joypad 250 in the direction of the upward one of directional indicia 252 would result in the sequentially upward selection.

Upon the desired menu item being selected, the participant's choice is indicated by pressing a select button 254. If the participant wishes to abandon that selection, the clear button 258 can rescind that choice. If the clear button 258 is pressed either before making a menu choice or after having rescinded a menu choice, then the participant exits the entire show selection interface.

Subsequent levels (not shown, but discussed in conjunction with FIG. 5) in the show selection menu become even more specific and eventually lead to the identification of a particular show to be initiated or resumed. With a specific show or other data presentation indicated through the hierarchical menu, the participant can use the select button 254 to initiate the show. The process of initiating or resuming a show is described in more detail in conjunction with FIG. 4.

It will be readily understood by those skilled in the art, that a wide variety of mechanisms for selecting a show to initiate or resume can be designed. For instance, commonly selected favorites, such as the current traffic report, might be assigned to a single button such as function buttons 260, 260'. Pressing the function button 260 would allow the participant to initiate the assigned show.

In an alternative embodiment, the display 120 is provided through a speech interface such that an interactive voice response (IVR) system may prompt the participant with the spoken phrase "What Show?" The participant could respond "Recent," and a voice recognition function would make the menu selection. Note that the voice recognition function may be performed either in the processor 110 or by a remote speech interpretation system (not shown). Such IVR techniques are well known in the art and many implementations are readily available, both on local and remote processors. The nature of the display 120, whether graphic or audio, and the locus of computation to determine the participant's selection, whether local or remote, does not alter the fundamental operation of the present invention.

The cell phone may support a remote earpiece 174, or a headset having stereo capability (not shown) to better perform the function of the audio output 180. The remote earpiece 174 or the headset may be wireless or connected via a cord 172.

Figure 3:
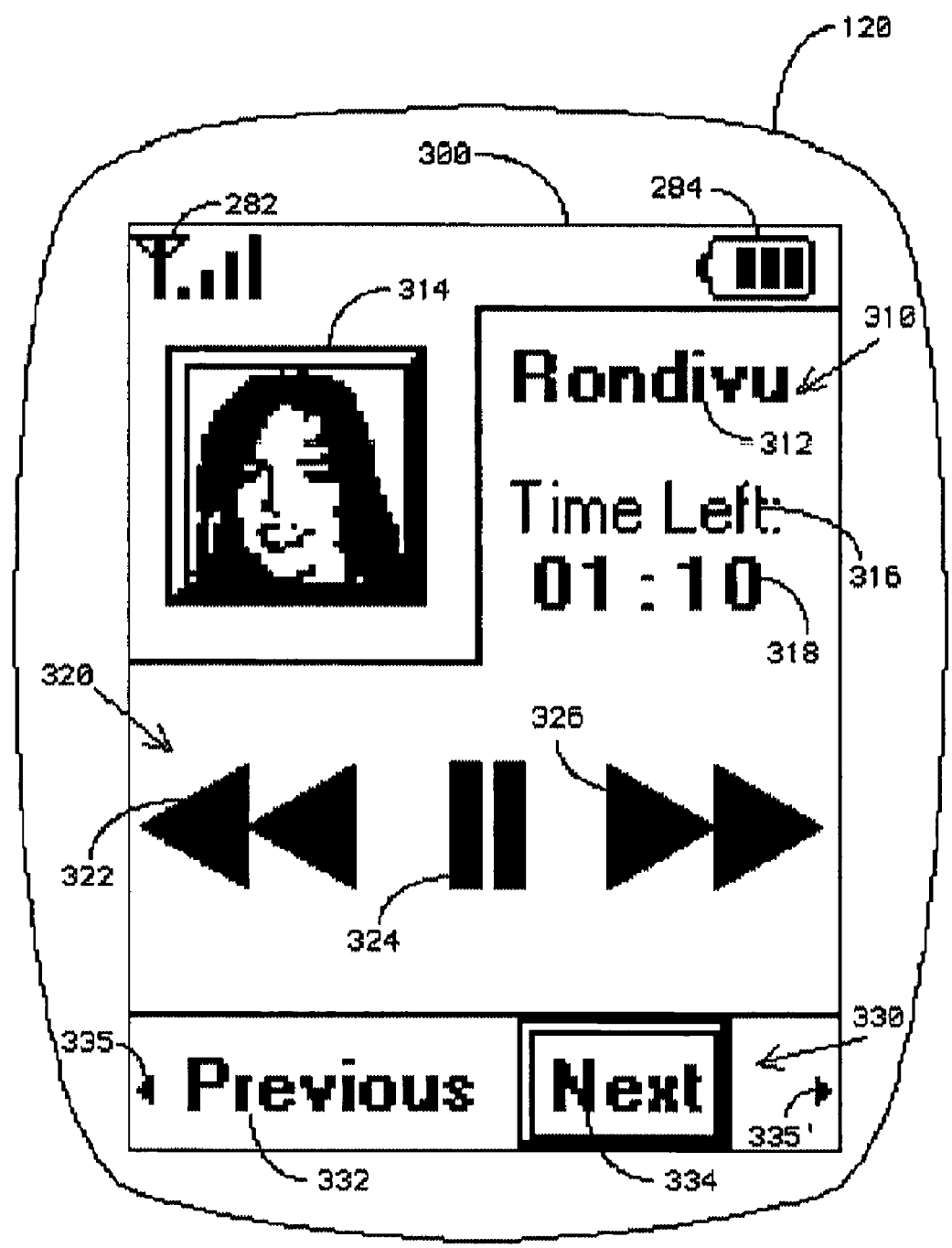
FIG. 3 depicts an implementation of a user interface supplied to a participant while a show playback is in progress.

FIG. 3 shows the show in-progress user interface 300 on the display 120, as it would appear in the cellular telephone implementation of the station 10.

Current show data 310 preferably includes a title or other name 312, which may be a song artist, book author, speaker, chapter name, etc. In addition, an image 314 may be provided to augment the show. The image 314 may be a picture of the artist performing the show, an occasional illustration of the show's action (e.g. the wood cut illustration of Capt. Billy Bones keeping to himself at the inn in the first chapter of Robert Louis Stevenson's Treasure Island), or a more frequently changing illustration, as accompanies the dialog in a comic book.

While the image 314 could be full-motion video (or nearly so), the bandwidth requirements and the utility of the visual component on a small, portable screen (especially outdoors) is limited for many potential shows.

It is also possible that the image 314 is a computer graphic rendering of a 2D or 3D scene. Such a rendering would be produced locally on the station 10, but from scene and camera data provided by the media server 70 and presented in appropriate synchronization with the show.

Informational displays such as the one headed by a time left label 316 and expressed in a time left display 318 are described in reference to FIG. 4, below.

Show controls 320 minimally provide the ability to start and stop the presentation of the current show. A pause button 324 when activated using the controls 100 (perhaps via the joypad 250) would halt playback of the current show. The pause button 324 would be replaced by a play button (not shown), the activation of which would resume the show from its paused position. Preferably, controls for other familiar features such as a fast-forward button 326 and a rewind button 322 are made available. Further, controls to skip forward or back by temporal or contextual quanta (e.g. 30 seconds or to the beginning of the chapter, respectively) can be provided also.

An alternative to the show controls 320 being presented on the display 120 would be to have them available on a numeric keypad 270 as shown in FIG. 2. For instance, by publicized convention fast-forward might be commanded by a #3 button 272 of the numeric keypad 270. Such controls are commonplace and well known in voice mail systems.

Other controls such as ending playback of the current show can be called for by elements of the UI (for instance, a menu item on an actions menu 330 as shown in FIG. 3), or by employing discrete buttons on the control section 230 such as clear 258 or hang-up 256' as shown in FIG. 2.

In some implementations, the actions menu 330 is presented for participant actions. Contents of the menu 330 will vary, depending upon the status and nature of the current show selected by the station 10. The menu items may change whether the current show is paused or not, or whether certain options are presented (e.g. selecting whether the image 314 is small or dominates the display 120), or whether the show itself is dependent on participant input (e.g. a choose-your-own-adventure style game).

As shown in FIG. 3, a next button 334 is the currently selected menu item as noted by a highlight box. The availability of unselected items too numerous to be shown on the display 120 is indicated by horizontal scroll indicia 335 and 335'. The currently selected menu item can be selected by pressing the select button 254. Alternatively, the leftmost menu item (currently shown as a previous button 332) and the rightmost menu item (currently shown as the next button 334) can be selected by the function buttons 260, 260' respectively (absent the shortcut assignments previously discussed), whether or not the associated menu item is highlighted. The leftmost and rightmost menu items and those not shown on screen can be viewed and highlighted by pressing the joypad 250 left or right.

The following discussion involves items that are preferably listed in the actions menu 330, and their corresponding function:

A save button (not shown) is the action taken by a participant to end playback of the show, for now. The participant will be able to return to the saved show sometime in the future. This differs from the pause button 324, in that the show in-progress interface 300 is closed by the save button, whereas the pause button 324 merely stops the playback but is immediately ready to resume.

When the show in-progress interface 300 is closed, the participant is preferably returned to show selection interface 280.

A drop button (not shown in the actions menu 330), a menu item similar to the save button, also discontinues playback of the current show and returns to the show selection menu 280. However, the drop button does not provide the ability to resume at a future time. The drop button is used to exit and discard an unwanted show.

A send button (not shown in the actions menu 330) when selected will allow a participant to send the current show to another participant. When selected, the send action accepts from the participant the user name (discussed below in conjunction with FIG. 4) of another participant. A show sent to another participant will appear in that participant's show selection menu 280, under an additional recommended button (not shown). Preferably, the sending participant can annotate the recommendation with a text message. Alternatively, the annotation can be made as a voice mail message (voice mail storage not shown).

A mark button (not shown), is preferably the default menu item. This will minimize delay in capturing a segment currently playing by bookmarking it. Subsequently, a bookmarked passage may be returned to (see GoTo, below) or it can be sent to another participant. A bookmark sent from another participant preferably appears in show selection menu 280 under the recommended button, described above. Bookmarks created by a participant for personal use may be available within a show using a goto button, discussed below.

The goto button (not shown in the actions menu 330), will jump to a location within a show that was bookmarked by a participant. If more than one bookmark is present, selecting the goto button preferably brings up a menu where annotations can be displayed and selected.

Alternatively, no menu is presented when the goto button is selected, and the first bookmark is jumped to and the show plays at that point. If more than one bookmark is present in a show, consecutive presses will jump to consecutive bookmarks.

If a bookmark was sent by another participant, then selecting that show from the show selection menu 280 will produce the show in-progress user interface 300, preferably with the goto button as the selected, highlighted menu item. In this manner, receiving a recommendation and finding the pertinent passage that a friend consider would be of interest to you is an easy matter.

A join button (not shown), allows a participant to find and join a conference call in-progress among aficionados of the currently selected show. The methods and apparatus for supporting such a joining are described in detail in co-pending patent application by Weisman et al., previously mentioned.

For such a transaction to be made most easily, the access manager 20 and a conference call management element of a conference call system (not shown) are preferably able to communicate with each other and interact with each other directly.

Alternatively, the communication system 2 can take information about the currently selected show, such as the show name, and provide that as a parameter to a separate conference call application, similar to Weisman et al. The information about the currently selected show passed as a parameter will be used to search for conference calls having the show as a topic.

Preferably, once a conference call is joined, the participant can continue to listen to the show of interest while also monitoring the conference call. A particular one of controls 100 or a user interface element (not shown) would be used to switch between the conference call management interface, and the interface for managing the show in-progress 300.

Figure 4:
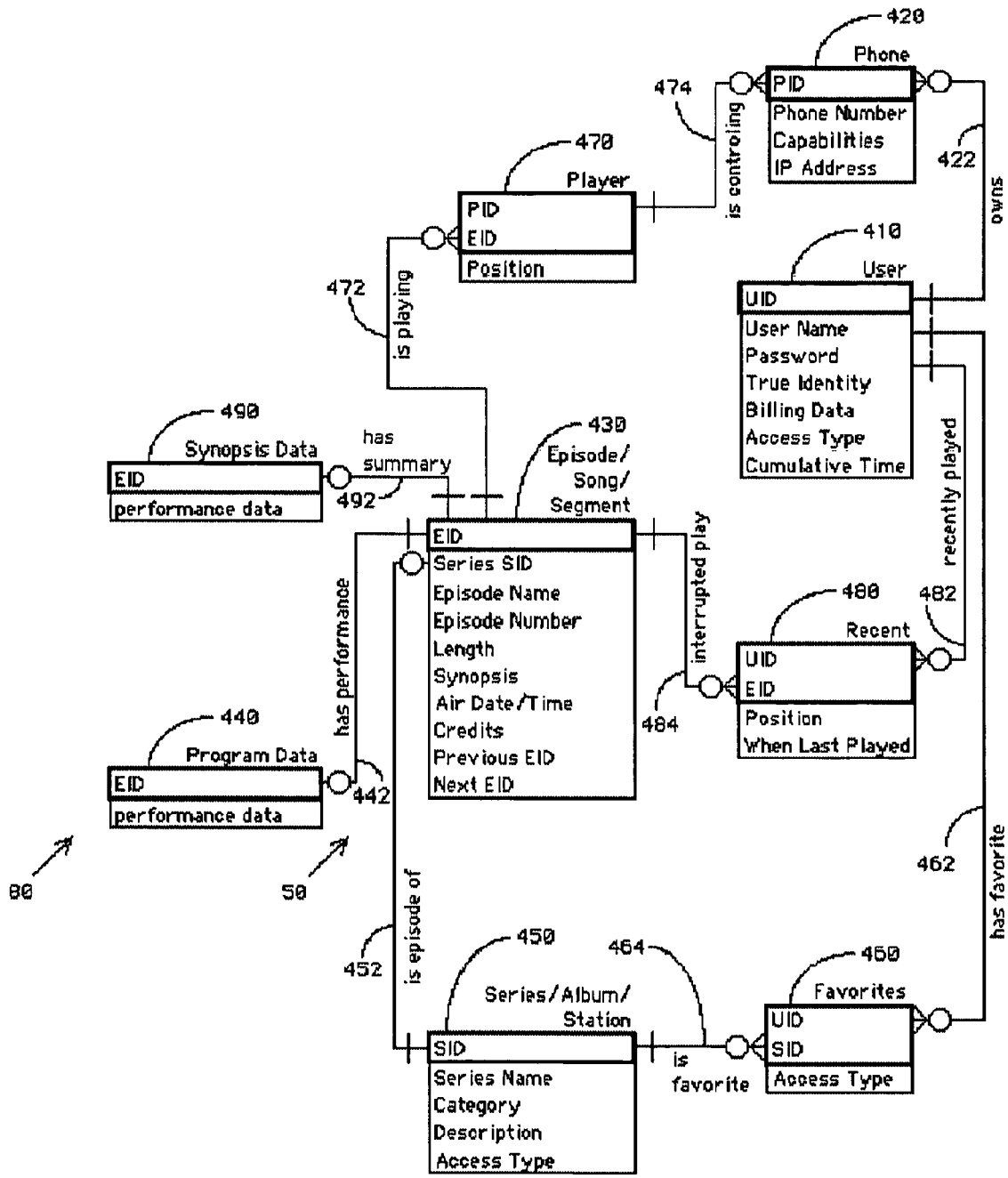
FIG. 4 is a representation of data and relationships tracked by the head-end; and, FIG. 5 is a schematic of a buffering technique used by an implementation of the communication system.

FIG. 4 shows implementations of the participant/holdings database 50 and the media database 80 and identifies relationships therein. In some implementations, there is a single logical database used by head-end 18. However, the opportunities for optimizing system performance and maintainability will be significantly enhanced if the physical implementation separates most of the tabular database information from the large media files. In some implementations, user specific data (such as bookmark information used for resumption of recently played material) can be stored on the stations 10, 12 if further distribution of data is deemed appropriate for a given circumstance.

Database operations performed by the access manager 20 differ significantly in quality and quantity from the media services operations performed by the media server 70. The typical request made of the media server 70 and the media database 80 asks for a relatively large quantity of information (e.g., a show) to be transferred, potentially over a long period of time (e.g., the length of the show).

The typical request made of the access manager 20 and the participant/holdings database 50 is a query, typically involving the interaction of two or more database tables. Such queries are expected to have results available in a fraction of a second.

Those skilled in the art will recognize that the radically different kinds of data in the participant/holdings database 50 and the media database 80, when separated allow for effective optimizations that might be wasted or even harmful were the databases combined. Among the parameters that might be selected for such optimization include drive size, speed, disk access buffer size, transfer rates, cache sizes, backup strategies, mirroring strategies, etc.

Still, an alternative implementation could house all the data of the head-end 18 in a single database, and optionally combine the function of the media server 70 and the access manager 20. At some scales of implementation and with certain technology selections, such an arrangement may be the most economical, provide a certain ease of operational management, or be simpler and quicker to implement.

The participant/holdings database 50 contains information about participants, their preferences and status, information about shows, including descriptive information, categorization, and availability. The media database 80 contains the information of the show performance itself, including the audio data and image data, if any.

There exists a wide variety of database paradigms that can be used for various implementations. Some implementations use a relational database such as the one shown in FIG. 4.

It is to be noted that some data indicated herein symbolically as occupying a single column in the depicted implementation might, in other implementations, be multiple columns, or even be broken out into separate tables. In fact, such a breakout might be appropriate to conform to a desired degree of normalization. Such modification and normalization are well within the skill of those familiar with the art.

Throughout the following discussion, table and column names are capitalized for clarity. For each of a user table 410, a phone table 420, an episode table 430, a program data table 440, a series table 450, a favorites table 460, a player table 470, a recent table 480, and a synopsis data table 490 in FIG. 4, key fields are contained in a highlighted box at the top of the respective table. UID, PID, EID, SID, and AID are the native keys for the user table 410, the phone table 420, the episode table 430, the series table 460, and the advertisement table (not shown), respectively. All other occurrences of UID, PID, EID, SID, and AID are foreign keys in their respective tables.

Every participant currently online and engaged in a show, is represented in the user table 410. Preferably, participants are registered and their representation in the user table 410 is persistent. When they return to use the system at a later time, they make use of the records previously associated with them.

A newly created participant is issued a unique participant identifier, referred to as the UID (user ID), which may be used as the key to the user table 410. Each entry in the user table 410 includes the participant's user name, which is preferably unique. Depending upon the implementation, a password may be stored to verify identity—and using the password to verify identity can resolve an otherwise ambiguous user name.

Preferably, however, a returning participant's identity is automatically determined. Each time a participant uses one of the stations 10, 12 to access the head-end 18, the head-end preferably receives the phone number (as with caller-ID), or other identifying information, from the station. For instance, in an implementation using a personal computer, the Ethernet address of the network interface card (NIC) comprising communication channel interface 140 may be used. Another alternative would be for the serial number of processor 110 to be used, if available. In a browser implementation, a cookie can be used. All of these methods are well known and understood within the art. In a heterogeneous implementation of the stations 10, 12, it may be the case that different identifications are used for different stations.

For the purpose of this description, and for simplicity, but not by way of limitation, a single automatic identification mode of a telephone number is assumed. The skilled practitioner will immediately see the opportunity to provide the generalized or multi-mode identification techniques listed above, or others.

An entry in the user table 410 also preferably includes the participant's true identity, that is, the participant's real name.

Whenever a participant is making use of the system, it is useful to record which of the stations 10, 12 is being used. In this exemplary implementation, this is stored as the current phone PID. Were the participant to end a session or the connection to be otherwise terminated, the Current Phone PID would be set to a null value to indicate that the participant is off-line.

Billing data records any information necessary to contact, charge, or receive payment from the participant. Some details of a subscription plan may also be included in billing data. For instance, a subscription plan might be defined as providing access to 25 particular radio stations and up to three audio books per month. A different subscription plan might offer fifty hours of access to any show content. Another might allow unlimited access to old-time radio dramas.

The access type column of the user table 410 is used as a summary of the access permissions owing to a participant. These may be defaulted, set, or modified by changes in the participant's subscription (i.e., a subscription plan indicated in the billing data) or by marketing policies (e.g., a free 30-day trial)

One or more columns such as cumulative time may be provided to keep track of a participant's utilization of services. If a subscription plan includes fifty hours of use per month, it is important to record the actual time used each month. By extension, if a plan allows for access to three audio novels per month, a count of audio novels begun in a month would be kept in addition to, or instead of, cumulative time. Alternatively, cumulative time might be handled as a "time remaining" field, that counts down until it reaches zero.

Preferably, a participant's demographic data would contain information that would be useful as a marketing profile of the participant. The primary use would be for directing advertisements (discussed further below).

Finally, a column is preferably supplied to note the participant's location data. Rather than the address of the participant's office or residence (which may be available from within billing data), location data is supplied by a cellular telephone locator service. Cellular telephones are available which are equipped with a global positioning system (GPS) receiver, capable of determining the telephone's position on the globe. Other locator services can determine with which cellular site a telephone is communicating, and in some cases which antenna of the site is being conducting the communication. From these pieces of information, the cellular system can approximate the cellular telephone's position. It is the determination of such a locator service that would be used to populate the location data column whenever the participant is connected.

When a participant uses a specific cellular telephone as one of the stations 10, 12, the telephone will be associated with an entry in the phone table 420. Each unique one of the stations 10, 12 will be given a unique phone ID, or PID.

Preferably, the phone number is automatically provided by a caller ID function. Alternatively, an application on the telephone can initiate a query and determine the appropriate value for the phone number.

If the cellular telephone is capable of a data connection, the address for that data connection is recorded in the IP address column. If the IP address is dynamic, then this column may be updated each time one of the stations 10,12 makes a new contact with the head-end 18. When the connection to the head-end 18 is dropped or lost, then this field is set to a null value. If the IP address is static, rare for a cellular telephone but common among personal computers, then this value is not set to null.

When one of the stations 10,12 as a telephone makes an initial contact with head-end 18, the station must be associated with either a new participant, or a previously created one.

Once one of the stations 10,12 is established with a record in the phone table 420, the owner UID column establishes an owns relationship 422. By default, when a contact is made by one of the stations 10, 12 as a cellular phone identified because its phone number or IP address matches a record in the phone table 420, the related entry in the user table 410 is presumed. This can be overridden if several participants are sharing a single telephone.

When a participant connects using a particular phone, the current phone PID column in the user table 410 is set to the PID of the entry in the phone table 420 to establish an is using relationship 424.

For the purpose of this embodiment, the aggregation of all shows provided by the head-end 18 are represented in the episode table 430. In addition, these shows are organized into related groups which are represented in the series table 450. The utility of the series table 450 will be discussed below, and in conjunction with the browse pick 296 and the search pick 298. For now, this discussion presumes that the participant has selected an episode from the episode table 430. Such a selection would be made from the show selection menu 280 and its related menus (not shown), which will be discussed further, below.

Each show available in the participant/holdings database 50 has an entry in the episode table 430. Depending on the nature of the show, the entry might represent a single song, an episode of a radio drama, a segment of a continuous broadcast (e.g. a traffic report, an interview, headline news coverage, an in-depth news story, a period or inning of a sporting event—or the whole event itself, etc.)

Each entry in the episode table 430 is given a unique EID. Preferably, each episode is associated with a Series (discussed below) which, again depending on the nature of the show, might represent an actual series (e.g. the Lone Ranger radio drama), an album comprised of multiple songs, or the broadcast stream of a radio station.

Other organizations and breakouts of show data besides that represented in the episode table 430 and the series table 450 are certainly feasible, and would lie within the scope of the communication systems.

In some implementations, each show in the episode table 430 has an episode name. Where appropriate, an episode number is also provided.

As information both for the participant and for calculations of time remaining, a column is provided for the episode's length. This allows a participant to anticipate that a selected episode can be enjoyed in the time the participant allots.

A text synopsis is preferably provided to aid in the selection of the episode, or in the case of an episode in the middle of a serial program, the synopsis may relate the summary of the action that has take place in earlier episodes.

The column air date/time is useful for several functions. First, it is used to identify segments such as the five o'clock news on a radio station, and to differentiate between today's and yesterday's five o'clock news. Second, for standing libraries of shows, such as old-time radio dramas, the air date/time can be used to indicate the original air date of the show. Third, for shows that are scheduled but not yet available, for instance, the upcoming episode of a current radio drama, the air date/time may be in the future. This allows upcoming episodes to be listed with pertinent information in the library, even though they are not currently accessible for playback. Additionally, for certain modes of operation for the stations 10, 12, this timing can be used to schedule program capture, discussed below in reference to FIG. 5. Fourth, this value can be set to null to indicate that the show is upcoming, but as yet has availability is uncertain or has not been scheduled.

The column credits may be a list of performers, such as the singers and/or band or its members for a song, and/or may include copyright information or other data that may be of interest to a participant.

If the episode is one of a sequence and it is appropriate to be able to easily find the previous episode, then the previous EID column is set to reference that episode's entry. The first episode in such a series will have a null value in the previous EID column.

Similarly, the next EID column can be set to reference the next episode of a series. Note that in a currently unfolding serial, the next EID may point to a episode that is not currently available by virtue of a future (or null) air date/time.

Once an episode has been selected, assuming it is available, a participant can issue a command to start it playing. The control for this command is not shown in the figures, but would be present in one of the deeper select show dialog screens subsequent to the show selection menu 280. If the episode is not yet available, this start control (not shown) would be disabled. Preferably, an explanation as to when the episode would be available is displayed in lieu of the start control.

If the start control is present and is activated by the participant, a command is issued by the access manager 20 to the media server 70 with the instruction that the selected episode is to be played for the selecting participant. The selected episode is represented by its associated EID from the episode table 430, while the selecting participant is represented by the associated current phone PID from the participant table 420.

Upon receiving this command from the access manager 20, the media server 70 creates and begins management of an instance of a media player (an entity not shown, but in some cases contained within the media server, but also potentially distributed between the media server and the stations 10, 12—see the discussion associated with FIG. 5, below).

The media server 70 records the status of this media player as an entry in the player table (not shown). The current phone PID and episode EID are recorded and can uniquely identify the media player.

When an episode is first selected with the start control, the position column is set to zero, indicating that episode should be played from the beginning.

The media server 70 uses the EID from the player table to access the correct entry in the program data table 440.

The performance data in the program data table 440 is the representation of audio or multimedia presentation of the show. This might be a .WAV, MID, or .MP3 format audio file, or it may a AVI or .MOV or other format audio and video presentation. Further, the show might be stored in another multimedia format, such as any of those supported by media players such as Apple Computer's QuickTime, Microsoft's Media Player, or RealNetwork's RealPlayer, Macromedia's Director, Flash, and Shockwave formats, etc.

Preferably, the media player is able to make use of and update the value of the position column. The value of the position column in the player table initially directs the associated media player to a starting position in the performance data of program data table 440. Subsequently, the media player can continuously, periodically, or on an event driven basis update the position value in the player table.

A preferable alternative is for the position value in the player table and usable by the associate media player to be time-based. Thus, the position information would actually comprise a starting offset, given as a time index into the performance data, and the time at which the start command was issued (not shown). Thus, whenever the position in the player table is accessed, the current time-offset into the performance data of the program data table 440 could be computed. This arrangement has the advantage that the player table is only accessed when an event has occurred, and not on a continuous basis.

This computation, and the operation of the media player, would also include the nature of the previous command as stored in the speed column. Typical values for entries in the speed column might be +1, indicating that the media player should play at normal speed, +3 might represent fast-forward, −3 might indicate rewind, and zero would represent a pause. When initially created, the media player would set the speed value to +1, and the performance data would begin playing.

The controls 320 of show in-progress user interface 300 (and the other controls discussed relative to FIG. 3) affect the values of position and speed in the player table. For instance, activation of the fast-forward button 326 shown in FIG. 3 would set the speed value of the associated media player to +3. The position value would not be altered, but would react by counting upward at 3× its normal rate.

In the case of the alternative described above, at the time the fast-forward button 326 was selected, the current value for position would be calculated from the media player's last calculated position, last speed, and the length of the interval since the last command was given. This newly computed position would be clamped to not be less than zero, nor more than the length as recorded in the episode table 430. The newly computed position would be recorded in the position column, and the speed appropriate to the current command, e.g. +3 for fast-forward, would be recorded in the speed column for when the next computation is required.

Commands such as "skip forward 30 seconds" can be implemented in a similar manner, but the value of the position is incremented by 30.

Note that while the position and timing values here are being discussed as integers for clarity, the actual values for position and speed may have a higher degree of resolution than integral seconds. For example, video or film based measures having an accuracy of $\frac{1}{30}$ or $\frac{1}{24}$ seconds, respectively, could be used.

When a change is made to Position or Speed entries in the player table as the result of a participant command, the associated media player is notified and takes the appropriate response.

When the end of the performance data is reached by the media player, the media player sets the associated speed entry to zero and the position value to match the length value in the associated entry in the episode table 430. If the media play rewinds to the beginning of the performance data, the speed column is again set to zero, as is the position value.

Situation: The media player has stopped at the end of the performance data from the record in the program data table 440 associated with a record in the episode table 430. A subsequent press of a play button (not shown, but a member of controls group 320) results in the episode indicated by the next EID value to become the current record and the associated data from the program data table 440 to begin playing. Alternatively, the participant can be offered a dialog presenting the choice to continue or not, but that may be deemed too intrusive an interface. True, even the pausing at the end of an episode may be too intrusive for some shows (e.g. the consecutive songs on an album or in a collection). It may be desirable for such series to have a flag in the episode table 430 or the series table 460 to indicate the appropriate behavior to be taken at the end of each episode (e.g. STOP, OFFER NEXT EPISODE, WAIT THREE SECONDS—THEN PROCEED, PROCEED DIRECTLY TO NEXT EPISODE, etc.)

The current value of the media player position, whether continually or periodically updated, or obtained by calculation, may be used to generate information displays such as a time left display 318 shown in FIG. 3. However, such information displays can be computed and incremented locally by the processor 110. The position, speed, time of last command, and length values of the player table and the episode table 430 can be made available to and in some cases are provided by the station 10. Thus, it is usually within the ability of the processor 110 to provide continuous updates to informational displays such as the time left display 318 (which would be the difference between the show's length and the calculated current position).

In any case where a value in the player table is being computed or modified, the authoritative source for time and position data is preferably the media player itself. There are always latencies associated with message transport across the communication channel 150, and with event queuing in the station 10, the access manager 20, and the media server 70. Only the media player authoritatively knows which data has been accessed, sent, or played before a "pause" command or a "skip forward 30 seconds" command was carried out. The precisely position of the next audio or graphical sample to be rendered will only be discernable by the media player.

If the currently playing (or stopped) episode has non-null values for the previous EID and/or next EID columns in the episode table 430, the previous button 332 and/or the next button 334 will be available, respectively, in the actions menu 330. The result of a participant selection of either of these menu items will be as if the appropriate episode had been selected via the select show dialogs (not shown) subsequent to the show selection menu 280.

The EID column of the program data table 440 defines a has performance relationship 442. Not every episode in the episode table 430 will have associated performance data in program data table 440. Specifically, shows which have future or null air date/time values in the episode table 430 will usually not have no performance data associated by the has performance relationship 442, until shortly before a scheduled air date/time.

The media database 80 also provides a performance data column in the synopsis data table 490. The performance data referenced by this table represents a "coming soon" kind of teaser suitable for enticing a participant to partake of the entire episode, or may represent a recap of "the story so far," for use with an episodic presentation.

The synopses represented in the synopsis data table 490 are used by media players just like the full programs of represented in the program data table 440. (The length of the synopsis performance data would be made available in a manner analogous to the length column in the episode table 430, but is not shown).

The provision of the synopsis data table 490 and a has summary relationship 446 provides the ability for a play synopsis command to be presented to a participant. This command is preferably presented with the start command, previously mentioned as appearing in the deeper select show dialog screens (not shown) subsequent to the initial show selection menu 280.

When the save button is selected, the current status of the player, as stored in or computed from the associated entry in the player table, is transferred to a record in the recent table 480.

The same transfer should occur if a media player is unable to continue with a show. If the communication channel 150 is interrupted or either of the station 10 or the head-end 18 becomes disconnected, the media server 70 is able to determine where the unintentional halt occurred, and initiate a save at that point. If, because of buffering described later in conjunction with FIG. 5, a media player resident on the station 10 is able to continue playing in spite of the severed connection, and the participant selects save action before the buffer has run out, then the station 10 will queue the save event with all of its parameters for execution when the connection is reestablished.

Note that an interrupted playback of performance data from the synopsis data table 490 preferably does not generate a record in the recent table 480. Further, the save button, the mark button, the send button (not shown), or the goto button menu items are preferably not available when playing from the synopsis data table 490. However, these features could be provided in an alternative implementation.

If while in the playback of an episode, a participant decides that the show is completely unsatisfying or has no further value, the participant can select the drop button from the actions menu 330, the playback is halted, as with the save button, but any associated record in the recent table 480 is deleted. In so doing, the ability to resume the episode, related series, and access to any bookmarks (discussed below) is abandoned. (Actually, experienced UI practitioners will observe that initially marking a record as abandoned may be preferable to actually deleting it outright. This is analogous to files on the desktop in Apple Computer's Macintosh OS are moved into the trash can and later deleted when the user is confident that he is past regretting the action. Such an implementation might be used here, but for simplicity of explanation, is not illustrated herein.)

No less frequent than upon a save or drop command being issued by a participant, is it appropriate to increment the cumulative time value in the user table 410. Other implementations are certainly possible, such as an ongoing or periodic calculation of cumulative time. In the alternative, cumulative time might be incremented by the Length value from a show's entry in the episode table 430 at the time the episode is first started and the record in the recent table 480 is created. This latter method is particularly useful under certain scenarios where a significant amount of un-consumed media is buffered by the station 10 and its consumption (i.e. how much of it has actually been played) is not reliably determinable from the head-end 18. In this case, if the addition of an episode's length to the participant's cumulative time would exceed the access plan, the episode is not available to the participant and the appropriate explanation is displayed.

Each entry in the recent table 480 is uniquely identified by the participant's UID and the EID of the episode that was being played. When transferring a record from the player table to the recent table 480, the PID from the player table is translated to a UID, preferably through an is using relationship 424. Alternatively, and with the apparent limitations on the freedom to lend your telephone to other users, the translation from PID to UID can be made through an owns relationship 422.

The value of position in the recent table 480 is taken from the Position column in Player table.

If a record having the composite foreign key UID/EID already exists, then that record is overwritten. If the record does not exist, it is created.

The when last played column is populated with the current date and time when the save button was issued.

The UID of recent table 480 is used to form the recently played relationship 482. The EID is used to form an interrupted play relationship 484. When a participant selects the recent menu item 292 from show selection menu 280, a subsequent dialog (not shown) listing the episodes found by the following the recently played relationship 482 through the interrupted play relationship 484 (that is, by joining the recent table 480 where UID=the current participant to the episode table 430 where the EID of Recent=the EID of Episode). The participant can then scroll among the episodes so listed, which represent his list of interrupted shows.

The participant can then select an episode to be played from where it was left off. In doing so, a media player is instantiated as previously described, but instead of setting the position column of player table to zero, the value is taken from the Position column of the associated record in the recent table 480.

Besides resuming an episode listed by pressing the recent pick 292, and subsequently selected, a participant can delete the associated record from the recent table 480. Further, automatic processes may delete Recent records older than some interval, for instance, 60 days.

The resume last pick 290, the default selection for show selection menu 280, operates in a similar manner using the recent table 480, except that the records are sorted in order of age, with the most recent (i.e. highest value for when last Played column) automatically being selected and played.

If a participant is playing a show and finds a particularly relevant or enjoyable passage that he would like to replay later, the mark button, is used. In so doing, an entry is created in a bookmark table (not shown). The new entry receives the UID and EID column values in the same manner as the participant's entry in the recent table 480 for the same episode. The position column receives the current value from (or calculated from) the associated record in the player table. Finally, if desired, the participant can enter a note into the comment column. Preferably, this note is a text comment, but in an alternative embodiment, it could be a brief voice annotation.

If a participant is playing a show and determines that a friend or associate would enjoy or find informative the same show, he can select the send button (not shown). In a subsequent dialog, the participant indicates to whom he would like to recommend this show. The indication may be made by selecting from a list, entering a telephone number, or the other participant's user name, or other uniquely identifying information known to the system that can be translated into the UID of the friend's record in the user table 410.

The result is that a new record is created in the recent table 480, having the EID of the current episode and the UID of the friend. However, the value in the from UID column is set to the UID of the sending participant, forming the from relationship (not shown).

By default, the position of the recommendation in the recent table 480, is preferably initialized as zero. However, the sending participant is preferably given the option to place a bookmark at the current position and provide a comment, as when using the mark button. Such a bookmark might be kept in his own record, too. Optionally, any or all previously establish bookmarks in the episode being recommended can be selected and included with the recommendation.

If so, any bookmarks duplicated will result in new records in the bookmark table and will bear the position and comments entered or duplicated. However, the UID will be that matching the recommendation record in the recent table 480, rather than the UID of the sending participant as recorded in the original bookmarks.

When the friend is next at the station 10, the show selection menu 280 will now contain a recommended pick (not shown). The dialog that follows subsequently will not only list the episodes as after selecting the recent pick 292, but will also display a message similar to "recommended by your friend [user name]", where [user name] is replaced by data found through the from relationship.

Note that the function of the resume last pick 290 and the recent pick 292 will only select those records in the recent table 480 having a null value in the from UID column.

In order to support the browse pick 296, it is necessary to organize all the holdings represented in the episode table 430 in a coherent way. Once such way is represented in this preferred embodiment, but the skilled practitioner will recognize many others.

The series table 450, contains information that is common to one or more shows represented in episode table 430. Each series is noted in a record of the series table 450 is given a unique SID value.

Typical columns include series name, category, and description. An example, representing a well known series from Paramount Studios might be represented as {"Star Trek: the Next Generation", "science-fiction", "adventures of a starship crew in the 23rd century."}.

It is entirely reasonable to include more data, for example allowing the category field to contain multiple values, e.g. {"science-fiction", "adventure"}. Also, additional columns could be added, e.g. year (not shown). Further, categories can be made hierarchical, to make navigation on small screens more manageable by having shorter deep menus, instead of long shallow ones, e.g. "fiction/science-fiction/future/space". By allowing multiple values, and hierarchical arrangements, there may be multiple paths to finding a given episode, which may better represent the ways different participant might attempt to browse for shows.

Such predefined hierarchies are familiar to users of www.eBay.com, the online auction web site by eBay, Inc. of San Jose, Calif., which lists auctions under predefined categories. Another useful aid in navigating such hierarchical menus is to have a number after each non-terminal entry in the hierarchy indicating how many series may be found under that entry. An example of hierarchies presented in this manner (though not specifically related to series or shows) is the "Yahoo! Directory" at www.yahoo.com by Yahoo! Inc. of Sunnyvale, Calif. Both the eBay and Yahoo! Hierarchies are pre-established by the staff maintaining those web sites.

The access required column of the series table 450 is a mechanism to limit access to individual series. A participant is permitted to access a series if an access type listed in the user table 410 is at least sufficient to meet the restrictions set forth in the access required column of the series table 450. Additional constrains on Access might be imposed.

For example, if the access required for a series representing an audio book might be set to "AUDIOBOOK:1", meaning this counts as one audio book. For a participant to access this particular series, the associated record in user table 410 would have to have an access type of "AUDIOBOOK:X", where 'X' is one or more. In the preferred embodiment, accessing this audio book would decrement the participant's access type column in the user table 410 to subsequently read "AUDIOBOOK:Y", where 'Y' is the value of X−1.

By way of example and not by limitation, other possible values are described here. Some series may have an access required of "OPEN_ACCESS," to indicate that no special access type is required. Some participants may have an access type of "UNLIMITED_ACCESS" which would meet any access required restrictions. Such an access type would be appropriate if the participant is operating under a cumulative time plan, described above. Some series might include in the access required the value "RATED_R," which might impose a rule that no participant under the age of 18 would be granted access. This would require that the participant's age (not shown) be included in the user table 410.

After the series is accessed by a participant through the series table 450, and a "cost" has been paid from the access type column, a record in the recent table 480 is preferably be generated for having a position value of zero for the first episode of the series. This will allow the participant subsequently access to the series that is both convenient and does not require a subsequent access check.

When a participant attempts to access a series through a series list generated through the browse pick 296 or the search pick 298, a check is made to determine if there exist any records in the recent table 480 related by interrupted play relationship 484 to an entry in episode table 430 that fulfils the is episode of relationship 452 to the selected series. If the check finds that such a record exists in the recent table 480, then it is preferably used to initiate playback of that episode, without an access check. Alternatively, the participant can be queried whether the first episode of the series is preferred over the episode and location recorded in the recent table 480 entry, but still the access check is not required.

The benefit of this arrangement is that once you've bought, for example, an audio book, you will have access to all of its chapters (episodes), and won't accidentally lose your place. Similarly, if you buy access to a particular radio station, you can have access to the entire broadcast history that is designated as a series.

Each show represented in the episode table 430 is associated with a series by having the series' SID recorded in the series SID column of the episode table 430, thus creating the is episode Of relationship 452.

When a participant selects the browse pick menu item 296, subsequent select show dialogs (not shown) list categories, preferably hierarchically as mentioned above. Ultimately, series matching the selected categories are listed.

A similar listing of series will be the outcome of selecting the search pick 298. The intermediate screen will be a search query dialog (not shown) wherein a whole or partial series name, category or description may be entered. Series meeting such criteria will be returned and listed. Additionally, criteria may be compared against values in the episode name, synopsis, and credits columns of the episode table 430. The Series SID column from records matched would be used to return or add to the list of series presented. A search would preferably eliminate duplicate series entries.

It might be noted here, that in an alternative implementation, the series SID column of the episode table 430 may be implemented as a multi-valued field. In so doing, the is episode of relationship 452 becomes one-to-many, allowing an episode to be a member of multiple series. Such an arrangement would be desirable to allow a show, such as a radio station's broadcast stream, to be packaged into multiple products. For example, an all-news radio station might subdivide its broadcast into multiple, overlapping series so as to offer several packaged products such as Headline News Archive (all the historic the top-of-the-hour news segments), This Week In Sports (comprising the sports reports for the past seven days), Lakers (comprising the most recent game call for the station's local basketball team), Traffic Report (comprising any traffic reports issued in the last 30-minutes), KXYZ Now (which is simply access to the station's most recent few hours of broadcast, up to and including the live signal). A participant accessing the radio station's series Traffic Report will find a partially overlap with the series KXYZ Now, as they will have Traffic Report segments (episodes) in common.

When a listed series is selected, information such as the series description can be displayed. Alternatively, the performance data from the synopsis data table 490 associated with the first or earliest episode of the series can be played (e.g. the episode having an entry with the matching Series SID and lowest episode number or the lowest valued air date/time)

When series is so displayed, a participant may choose to start playing the first episode, or may elect to make the series a favorite (neither choice is illustrated in the figures). When a favorite has been designated, a new entry is created in the favorites table 460. The SID of the series displayed and the UID of the participant are recorded to uniquely identify the favorite. This establishes an is favorite relationship 464 and has favorite relationship 462.

In an alternative embodiment, when created, the value from of the access type column of the user table 410 used to overcome the access required value of the series table 450, is identified in the access type column of new entry in the favorites table 460. For example, if the access required is "AUDIOBOOK:1" and the participant's access type in the user table 410 is presently "AUDIOBOOK:3", then the access type column in the new record in the favorites table 460 would be "AUDIOBOOK:1". The original value in the user table 410 would be reduced to "AUDIOBOOK:2". Note that this configuration is not necessary if a record is created as previously described in the recent table 480 upon accessing a series for the first time.

When a participant selects the favorites pick 294, a subsequent select favorite show dialog (not shown) offers a list of series which have the is favorite relationship 464 with a UID matching the participant. When a series is selected from the offered list, a check is made (as previously described) to determine if there are any pre-existing records in recent table 480 having an interrupted play relationship 484 with an episode having the is episode of relationship 452 with the selected series. If so, the participant is preferably given the choice of resuming that episode, or starting at the beginning of the series.

The implementation described above of the in show selection menu 280 allows for no series or episode to be accessed without first accessing them through the browse pick 296, or the search pick 298. Only after a series has been accessed by these methods will it appear under the favorites pick 294 and the recent pick 292, or be accessible through the resume last pick 290.

An exception to this will be episodes sent by one participant to another. These will appear under the other participant's recommendations pick (not shown), but appropriate to the show selection menu 280).

It is a matter of policy how recommendation records in the recent table 480 are managed with regard to the limitations expressed in the access required field of the series table 450. It can be the policy of the system that any recommendation is available to the receiving participant. This would promote word-of-mouth advertising, by effectively sending samples of products from one user to another. However, such a policy, unconstrained, may be subject to abuse.

It can be the policy that a participant is limited in the number of recommendations that he makes. The access type column of a participant's record in the user table 410 might include a value of "RECOMMENDATIONS:20" which would be tested and decremented with each recommendation sent.

It could be the policy that the "RECOMMENDATIONS" element of the access type is only decremented when the participant to whom the recommendation is sent would have otherwise been required to expend some of the credits of his own access type record. In other words, a recommendation made to someone having an access type of "UNLIMITED" would not result in a decrementing of the sender's access type value.

It can be the policy that a receiving participant is required to pay the access cost from his own access type field in the user table 410. This is analogous to someone suggesting that you go see a movie: the recommendation does not provide you with a ticket.

It can be the policy that a sending participant is permitted to convey his access to the receiving participant. This case would be analogous to the sending participant taking a book that he has read and giving it to the receiving participant, perhaps with the understanding that it will be returned later. Under such a policy, the records associated with recommended episode and the associated series in the recent table 480 and the favorites table 450 would be transferred from having the UID of the sending participant to having the UID of the receiving participant.

The policy and its implementation can be arbitrarily complex to address any appropriate business policy. The key in selecting the policy to not allow recommendations to unlock the valuable assets of the program database in an unbounded manner. The reason for this is that if free access is possible, the method will be discovered and exploited, thus burdening the system in an unlimited and unremunerated way.

Some policies, such as any participant under the age of 18 cannot have access to a series having an access required value of RATED_R, may be imposed regardless of the sender's access type. In such a case, where the receiving participant will be unable to access the recommended episode, the sender should be immediately notified that the recommendation fails, and recommendation record is not entered in the recent table 480.

It may be desirable, in an alternate implementation, to access restrictions at the episode level. To do this, an access required field could be added to the episode table 430, replacing or in addition to the one in series table 450.

An additional observation may be made concerning the situation where a recommendation is being received and yet the receiving participant already has a record in recent table 480 for the episode being recommended.

In this exemplary embodiment, the recommendation preferably takes the form of a bookmark with the note that the recommendation was made contained in the comment column of bookmark table. The bookmark is attached to the existing record in the recent table 480.

A slightly more complex but additionally functional implementation would include the from UID column of the recent table 480 in the composite foreign key for the table. Preferably, the from UID column would be replicated in the bookmark table so that each participant recommending and episode to a receiving participant can make his own bookmarks. In so doing, a list of recommended series (not shown) generated in response to the recommended pick can display flags to indicate series of which the receiving participant is already apprised.

This particular implementation of the participant/holdings database 50 and the media database 80 is merely exemplary and that may modifications to it can be made to add support for related features, or to implement them differently.

One particular example of this is a class of show data that (at least in one implementation) would require modifying the columns of the episode table 430 to accommodate. The class of show data is the choose-your-own-adventure branching story game. A series would represent a single story, and as with any series, it begins with the first episode, stored normally in the episode table 430 and the program data table 440. When the first episode (and subsequent ones) is played, the story unfolds and the episode ends with a choice being presented to the participant: "Do you turn left or right?", "Do you trust the guy?", "How much do you offer: 10,100,1000?". When the episode ends, the choice must be made by the participant and that will determine what follows. The addition to the episode table 430 (or a table appropriately related) is the list the episodes that comprise the various branches available at each. Column names such as choice 1 EID, choice 2 EID, choice 3 EID, etc. might be appropriate. It would be further preferable that the UI of the show in-progress dialog 300 be adapted to facilitate the selection. In addition to the controls 320, the choices might be illustrated on the display 120. Alternatively, the numeric keypad 270 might be used for numbered choices. Ideally, additional columns are provided in the extension to the episode table 430 that contain values used to label the choices. Names like choice label 1, choice label 2, etc. seem likely. With those, a menu list of choices could be displayed in the adapted show in-progress dialog 300. Once a selection is made, the indicated episode is played. The save button on the menu 330 still works, and the bookmark table could be adapted to form a save-game function.

The advertisement table is used if the system provides any class of access type in the user table 410 that is supported by advertising. An alternative way of viewing classes of access type, is that any access type other than premium services explicitly free of advertising, are supported by advertising.

In the advertisement table, each record represents an individual ad, and is uniquely identified by the AID value.

Advertisements in a system of the present invention come in the same form as do the shows, and that is as an episode. Thus, the presentation element of an ad is identified by an ad EID column, and creates an ad media relationship.

Each ad is preferably designated with a demographic requirement value. Such is valuable, for instance, so that ad for cars are directed toward adults, and more so that ads for station wagons may be directed toward parents.

In determining an ad to be run for a participant, the demographic requirement from the advertisement table is compared to demographic data from the user table 410. If a suitable match is found, the ad is run.

Each ad may optionally have a location requirement. Regional grocery stores will only be interested in advertising within their region, and preferably only near where stores are located (most folks won't drive a long way for groceries—they'll shop local). However, major detergent brands may be distributed nationwide. A Mom & Pop restaurant may only be trying to draw customers within a 10-mile radius.

An ad location requirement will only be satisfied by a participant having location data that meets the location requirement.

Note that a simple implementation of location could be an ad limited to participants whose residence address has a zip code contained in a list expressed in the location requirement of the advertisement table.

Preferably, a location requirement is expressed as a combination of a latitude/longitude pair and a range. Thus describing a circular area wherein delivery of the ad is appropriate. In an alternative embodiment, list of such circular areas could be provided for each ad.

In the preferred configuration, a participant's location data in the user table 410 is expressed as a latitude/longitude pair, possibly with a value representing uncertainty in the position.

If the location data of a participant falls within (or using the uncertainty data, may fall within) the area defined by the location requirement for an ad, then playing the ad is appropriate.

From all ads having the demographic requirement and location requirement met by a participant's demographic data and location data respectively, a decision is made automatically to determine which one will next play for the participant.

The decision of which qualified ad to play can be made by random selection, by function of episode number, by function of time-of-day, or by a utility function, or a combination of the above.

Each ad is given a utility value, recorded in the value data column of the advertisement table. The utility value might be how much money the operator of the system is paid for playing an ad to a qualified participant. The operator of the system will want to play high value ads more frequently than low value ads. The utility value may represent a priority that the advertiser has selected: for an individual qualified for two different car ads by the same advertiser, which of the two should be played? The one with the highest priority.

When playback of an episode is requested, the determination of which ad to play can be made and recorded in the recent table 480 for the non-advertisement episode in the last ad AID column. This establishes a sponsored by relationship (not shown). By doing this at the beginning of an episode, if the episode was stopped or interrupted, the appropriate ad sponsorship is preserved. Thus, a log of advertisements assigned to episodes (not shown) is a reasonable estimate of advertisements that have been played, and one method suitable for determining payments due from an advertiser.

An ad episode may only have performance data stored in the program data table 440, which would be the main content of the ad. However, an ad episode might also have a performance data entry in the synopsis data table 490. An ad synopsis might be a brief presentation of the form "Brought to you by the makers of Crest toothpaste."

In the course of playback for a regular show episode, the advertisement indicated through a sponsored by relationship (not shown) is traced to find the episode indicated by an ad media relationship (not shown). From there, a has summary relationship 492 identifies the short blurb, and the has performance relationship 442 identifies the primary ad.

Alternative embodiments might include one or more ad position values (not shown) marking appropriate positions within a show episode for halting playback and inserting an ad. The halted playback would be as if the participant had used the save button, but rather than closing the show in-progress dialog 300, the ad is played. When the ad concludes, the playback of the show resumes as if the resume last pick 290 were selected.

In another alternative embodiment, an ad episode referenced by the ad media relationship might have a non-null next EID value. This would allow a progression of ads to be configured and played in sequence over the course of the show episode (e.g. an Energizer battery ad showing the pink battery-operated rabbit beating its drum, followed later on by the return of the rabbit with the voiceover "Still Going . . . ") After the first ad episode is played, the next EID value from the episode table 430 is copied to a next ad EID value (not shown) in the halted show episode's associated record in the recent table 450.

The benefit of such a configuration is to permit the most valued ad to be provided to an appropriate audience as a "commercial break": a familiar, integrated way of combining advertisements with the presentation of a show.

Figure 5:
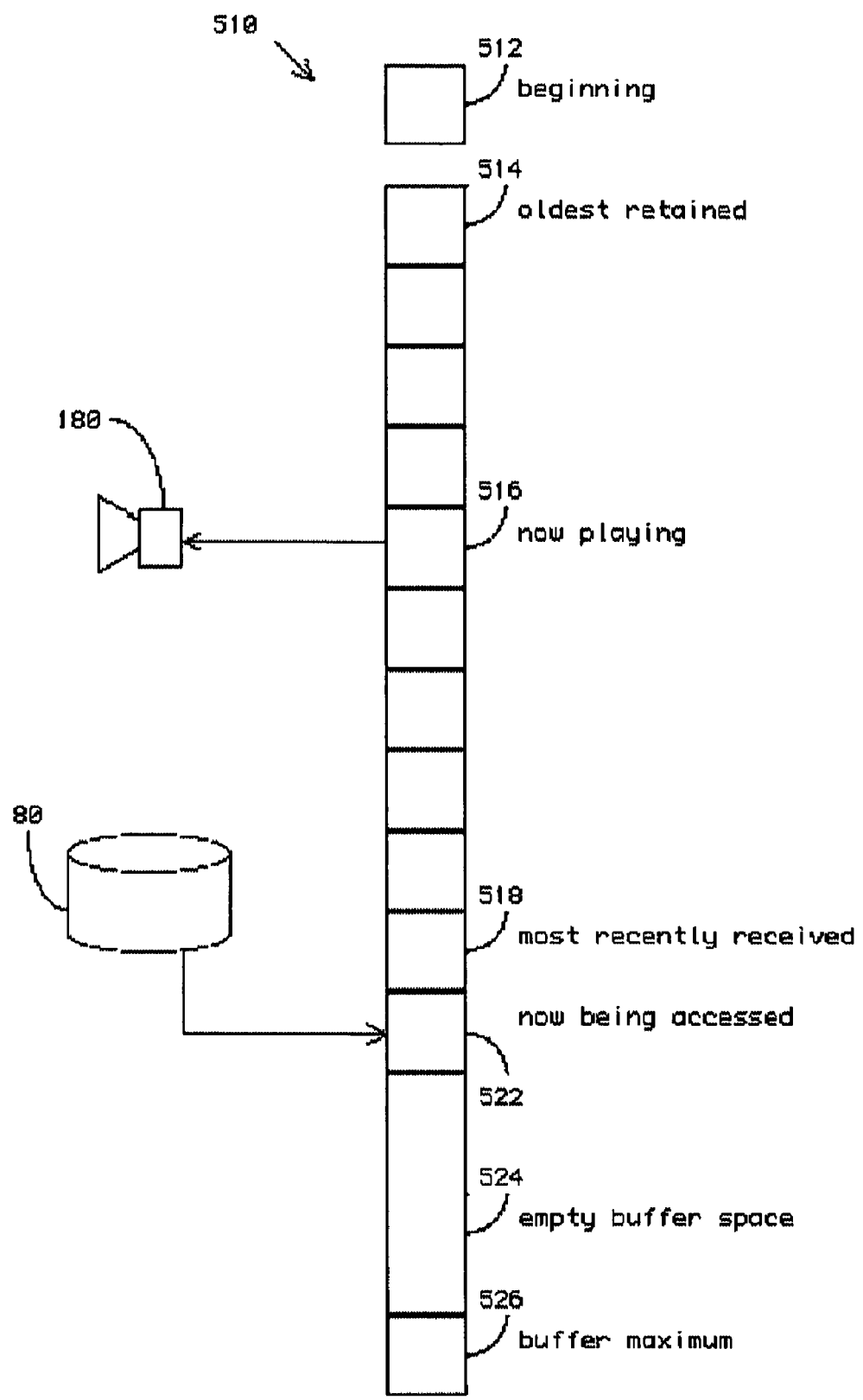

FIG. 5 shows an abstraction of the pipeline filled with audio data proceeding from the data as it is removed from the media database 80 to the point it is presented to the participant through the audio output 180. Between these two endpoints lies a buffer 510, which is comprised of many segments.

Note that while, in the limit, the "many segments" comprising buffer 510 might be individual samples, or the stream of instantaneous values of an analog signal—for the purposes of this discussion, it is useful to think of somewhat larger chunks, such as the size of the data payload in a UDP or TCP/IP datagram, or the size of sector on the hard drives comprising the hardware of media database 80.

Further, while this discussion is directed to the context of audio data, the actual performance data found as values of the program data table 400 and the synopsis data table 490 may be multimedia data, and include images, animations, video, or other elements (e.g. programs, scripts, annotations, triggers, hypertext markup language (HTML) documents, etc.) In addition, audio data may be music or voice rendered by a synthesis algorithm, located either at the head-end 18, or on the station 10. For instance, performance data may be composed of text, perhaps with inflection cues, which when accessed by the media server 70 is first processed by a voice synthesizer (not shown) to provide the audio signal transmitted to the station 10. Alternatively, the text might be transmitted to the station 10 and rendered by a voice synthesizer there.

The buffer 510, while an abstraction, will be embodied in physical portions of various alternative implementations. In order to play an episode's performance data found in the program data table 440, the data must be copied non-destructively from the storage media comprising the hardware implementation of the media database 80 into the buffer 510. This copying occurs at a now being accessed pointer 522, in the buffer 510. Beyond it, lies an empty buffer space region 524, and the upper limit on the size of the buffer defined by a buffer maximum pointer 526.

Somewhere ahead of the now being accessed pointer 522, is a most recently received pointer 518, which marks the point where the abstract buffer's physical implementation is definitively divided between that portion which exists on the station 10 (the part ahead of and including the most recently received pointer) and that portion which exists at the head-end 18.

Any part of the episode from the oldest retained pointer 514 to the most recently received pointer 518, is available for playback, even if the connection of the station 10 to the head-end 18 through the communication channel 150 is interrupted. Generally, the now playing pointer 516 will lie in the range from the oldest retained pointer 514 and the most recently received pointer 518, inclusive.

Rewind, jump, and fast-forward commands from the control group 320 and others inform the media server 70 of the head-end 18 of the command and present buffer status at the station 10. The media server 70 can then undertake to provide the station 10 with the appropriate media data from the media database 80 via the communication channel 150.

In one embodiment where the size of storage available to the portion of the buffer at the station 10 is very large, the entire episode can be transferred and stored between the oldest returned pointer 514 to the most recently received pointer 518. The controls 320 strictly affect the media player elements within the station 10. In such a case, the transfer of the episode data across the communication channel 150 may be fast and performed on demand. Alternatively, the transfer can be anticipated (algorithmically by virtue of the favorite series selections, recommendations sent by other participants, or next episodes that as they become newly available). In such cases, it may not matter if the transfer rate across the communication channel 150 is fast or slow, as long as their is enough time to transmit the episode data that is anticipated as being needed sufficiently in advance of the actual request.

Anticipation of demand is particularly useful for shows such as a radio station's traffic reports. At any given moment, a traffic report may be selected from the favorites list by a participant. It would be especially desirable for current traffic reports to be available, even if at that moment, access to the communication channel 150 is interrupted, in the case of a cellular telephone, perhaps because the participant is located within a subterranean parking garage but is trying to determine which exit to plan for based on local traffic conditions. In such a case, traffic reports that were available five minutes ago from the lobby of the office building would be perfectly adequate for the purpose.

Similarly, the next chapter (or several) of an audio book would be useful to anticipate and pre-load to the portion of the buffer 510 located on the station 10. This is especially true if one will soon board an airplane and discontinue cellular telephone service for the next several hours.

If starting an episode over at the beginning is a relatively common occurrence, a performance optimization that can be made is to retain the first portion of an episode's performance data in a beginning buffer 512. Thus, when the command is given to jump to the beginning of an episode, the command can be obeyed immediately, and the later (no longer retained in the buffer 510) portions of the performance data can be backfilled from the head-end 18 through the communication channel 150, preferably before they are needed for playing, as previously discussed.

In an embodiment that is less data oriented and more real-time stream oriented, such as a traditional telephone connection, the amount of buffering that occurs at the station 10 is essentially nil. The three pointers: the oldest retained pointer 514, the now playing pointer 516, and the most recently received pointer 518 collapse and refer to the same datum: the real-time, right-now signal being transmitted by the media server 70. In this case, the media player is wholly located at the head-end 18, and the controls of group 320 exclusively affect the media server 70.

A real-time stream does not, however, strictly limit the implementation to an all head-end based media player. For instance, whenever the station 10 is not being used to playback a show as it arrives from the head-end 18, it would be possible for an anticipating algorithm (for example, the traffic report capture previously discussed), to be downloading such program data.

Even when playback of a show is in progress from performance data already transferred to the participant station, additional performance data for another episode can be transferring from the head-end. Since the participant station will probably only be used part-time, amount of time available for downloading performance data will generally greatly exceed the amount of time available for playback.

For an example of an audio book of significant length, the pre-load of chapters (episodes) of the book is trivially predicted and is probably concluded well in advance, such as before getting on the airplane. Further, the most recent performance data loaded to the participant station is probably comprising of ads suitable to the participant while in proximity to the airport—for instance commercial parking garages, rental car companies, insurance companies, etc. Once aboard the airplane, the communication channel 150 is no longer available, and the ads available, while all appropriate to the participant, may no longer be appropriate to the location (which changes rapidly on a cross-country flight). Upon landing, the communication channel 150 is re-established, and a generous portion of the book has been played and is likely no longer needed. More importantly, most ads having a location requirement other than nationwide, are now inappropriate. Except for specific requests (e.g.: get the next chapter of that book!), advertising might take up the initial uploads from the head-end 18.

In an alternative embodiment, a participant's favorites (such as a traffic report or weather), may have a location requirement (not shown) in the series table 450. Shows listed in the episode table 430 would have location data (not shown) describing the episode's origin, when applicable. For instance, a traffic report in Los Angeles would have location data indicating a point in the Los Angeles area, whereas a Miami traffic report would be located in Miami. The location requirement of the series table 450 would constrain selection of episodes to include only those having location data (not shown) within a range specified in the series' location requirement (not shown) from the participant's current location data. This would be a simple way to gather the traffic reports or other local data (e.g. weather) appropriate to the area the participant is near.

While the preferred embodiment is discussed in the context of present day cellular telephones, computer workstations, traditional telephones, and current communication channels, it is contemplated that other modes of data display and input, voice interaction, and communication will become suitable as they are made available.

The particular implementations described, and the discussions regarding details, and the specifics of the figures included herein, are purely exemplary; these implementations and the examples of them, may be modified, rearranged and/or enhanced without departing from the principles of the present invention. In particular, the variety of examples for access criteria and rules of order just touch the surface of the capabilities which this invention makes possible.

The particular features of the user interface and the capabilities of the overall conference calling system, will depend on the architecture used to implement a system of the present invention, the operating system of the stations 10, 12 selected, the communication channel 150 selected, and the software code written both for the stations 10, 12 and the conference call server. It is not necessary to describe the details of such programming to permit a person of ordinary skill in the art to implement the application, user interface and services suitable for implementing a system within the scope of the present invention. The details of the software design and programming necessary to implement the principles of the present invention are readily understood from the description herein.

Various additional modifications of the described aspects of the invention specifically illustrated and described herein will be apparent to those skilled in the art, particularly in light of the teachings of this invention. Further, it will be apparent that the functionality of this invention can be incorporated into and function from within the context of other products, such as computer games, consumer electronics, or office productivity software. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

The invention claimed is:

1. A system comprising:
a communication network;
a station communicatively linked to the communication network, the station having an output and an interface; and
a head-end having at least one database configured to store programs including an audio content, the head-end configured to receive a request from the station via the communication network for a desired one of the programs, the head-end configured to verify the request by determining an identification, transmitting a first portion of the desired program to the station via the communication network based upon the request verification, and recording an association between the identification and the desired program, the head-end configured to suspend transmission of a second portion of the program based upon detection of an indication to suspend transmission, the head-end configured to transmit the second portion of the program based upon detection of an indication to resume transmission and based upon stored bookmark data indicating starting location in the program of the second portion,
wherein the identification determined by the head-end is at least in part associated with a location of the station and the head-end is further configured to transmit a version of the program based upon the location of the station.

2. A method comprising:
providing a communication network;
providing a station with an output and an interface;
communicatively linking the station to the communication network;
providing a head-end having at least one database configured to store programs including an audio content;
receiving a request at the head-end from the station via the communication network for a desired one of the programs;
verifying the request by determining an identification;

transmitting a first portion of the desired program from the head-end to the station via the communication network based upon the request verification;

recording an association between the identification and the desired program;

suspending transmission of a second portion of the program from the head-end based upon detection of an indication to suspend transmission;

generating and storing bookmark data based upon the indication to suspend;

transmitting from the head-end the second portion of the program based upon detection of an indication to resume transmission and based upon the stored bookmark data indicating starting location in the program of the second portion; and, wherein the determining the identification is at least in part associated with a location of the station and the head-end is further configured to transmit a version of the program based upon the location of the station.

3. A system for a user to send bookmarks comprising:

a communication network;

a station communicatively linked to the communication network, the station having an output and an interface; and a head-end having at least one database configured to store programs including an audio content, the head-end configured to receive a request from the station via the communication network for a desired one of the programs, the head-end configured to determine an identification, transmitting a first portion of the desired program to the station via the communication network based upon the request, and recording an association between the identification and the desired program, the head-end configured to suspend transmission of a second portion of the program based upon detection of an indication to suspend transmission, the head-end configured to transmit the second portion of the program based upon detection of an indication to resume transmission and based upon stored bookmark data indicating starting location in the program of the second portion;

wherein the station interface includes an in-progress user interface with a send button configured to, upon activation, send either a program or a link of the program being received to another user.

4. The system of claim 3 wherein the send button, upon activation, further sends at least one of a text comment and a voice annotation to the another user.

5. A system for a user to send bookmarks comprising:

a communication network;

a station communicatively linked to the communication network, the station having an output and an interface; and a head-end having at least one database configured to store programs including an audio content, the head-end configured to receive a request from the station via the communication network for a desired one of the programs, the head-end configured to determine an identification, transmitting a first portion of the desired program to the station via the communication network based upon the request, and recording an association between the identification and the desired program, the head-end configured to suspend transmission of a second portion of the program based upon detection of an indication to suspend transmission, the head-end configured to transmit the second portion of the program based upon detection of an indication to resume transmission and based upon stored bookmark data indicating starting location in the program of the second portion;

wherein the interface of the station is configured to provide a send selection capability that when activated by a user of the station sends a request to the head-end via the communication network to send information associated with the desired program to another user.

6. The system of claim 5 wherein the information includes at least a portion of the desired program.

7. The system of claim 6 wherein the send button, upon activation, further sends at least one of a text comment and a voice annotation to the another user.

8. The system of claim 5 wherein the send button, upon activation, further sends at least one of a text comment and a voice annotation to the another user.

9. A method for a user to send bookmarks comprising:

providing a communication network;

providing a station with an output and an interface;

communicatively linking the station to the communication network;

providing a head-end having at least one database configured to store programs including an audio content;

receiving a request at the head-end from the station via the communication network for a desired one of the programs;

determining an identification;

transmitting a first portion of the desired program from the head-end to the station via the communication network;

recording an association between the identification and the desired program;

suspending transmission of a second portion of the program from the head-end based upon detection of an indication to suspend transmission;

generating and storing bookmark data based upon the indication to suspend;

transmitting from the head-end the second portion of the program based upon detection of an indication to resume transmission and based upon the stored bookmark data indicating starting location in the program of the second portion; and sending either a program or a link of the program being received to another user upon activation of a send button on the station interface.

10. The method of claim 9 wherein the sending step further includes sending at least one of a text comment and a voice annotation to the another user.

11. A method for a user to send bookmarks comprising:

providing a communication network;

providing a station with an output and an interface;

communicatively linking the station to the communication network;

providing a head-end having at least one database configured to store programs including an audio content;

receiving a request at the head-end from the station via the communication network for a desired one of the programs;

determining an identification;

transmitting a first portion of the desired program from the head-end to the station via the communication network;

recording an association between the identification and the desired program;

suspending transmission of a second portion of the program from the head-end based upon detection of an indication to suspend transmission;

generating and storing bookmark data based upon the indication to suspend;

transmitting from the head-end the second portion of the program based upon detection of an indication to resume transmission and based upon the stored bookmark data indicating starting location in the program of the second portion; and sending information associated with the desired program to another user upon activation of a send command with the station interface.

12. The method of claim 11 wherein the sending information includes sending at least a portion of the desired program.

13. The method of claim 12 wherein the sending step further includes sending at least one of a text comment and a voice annotation to the another user.

14. The method of claim 11 wherein the sending step further includes sending at least one of a text comment and a voice annotation to the another user.

15. A system for a user to send bookmarks comprising:

a communication network;

a first station communicatively linked to the communication network, the first station having an output and an interface, said first station associated with a first user;

a head-end having at least one database configured to store programs including an audio content, the head-end configured to receive a request from the first station via the communication network for a desired one of the programs, the head-end configured to transmit the desired program to the first station via the communication network for playing on the output; and, a second station communicatively linked to the communication network, said second station associated with a second user;

wherein, said interface comprises a control for creating bookmarking data for the program to be sent to the second user, the head-end being further configured to transmit at least a portion of the program to the second station based upon the bookmarking data.

16. The system of claim 15 wherein the bookmarking data includes position information substantially corresponding to the position value within the program associated with the first station.

17. The system of claim 16 wherein the bookmarking data sent to the second user is accompanied by at least one of a text comment and a voice annotation.

18. The system of claim 15 wherein the control for creating bookmarking data does not suspend playing the desired program.

19. The system of claim 15 wherein the bookmarking data sent to the second user is accompanied by at least one of a text comment and a voice annotation.

20. A method for users to send bookmarks for programs comprising:

providing a head-end having at least one database configured to store programs including an audio content, said head-end having communication with a first station through a communication network, said first station having an output and an interface, said first station associated with a first user, said head-end further having communication with a second station through the communication network, said second station associated with a second user;

receiving a request with the head-end from the first station via the communication network for a desired one of the programs;

transmitting at least a first portion of the desired program from the head-end to the first station via the communication network for playing through the output;

creating bookmark data for the desired program in response to the first user selecting a mark action with the interface;

sending the bookmark data to the second user in response to the first user selecting a send action with the interface;

transmitting at least a second portion of the desired program to the second station in response to the second user using the bookmark data.

21. The method of claim 20 wherein said bookmark data comprises position information within the desired program representative of the current position playing when the mark button was used.

22. The method of claim 21 wherein the sending step further includes sending at least one of a text comment and a voice annotation to the second user.

23. The method of claim 20 wherein the mark action does not suspend playing the desired program.

24. The method of claim 20 wherein the mark action and the send action are selected together.

25. The method of claim 20 wherein the sending step further includes sending at least one of a text comment and a voice annotation to the second user.

* * * * *